US012273265B2

United States Patent
Li

(10) Patent No.: US 12,273,265 B2
(45) Date of Patent: Apr. 8, 2025

(54) PACKET TRANSMISSION METHOD, DEVICE, AND SYSTEM

(71) Applicant: Huawei Technologies Co., Ltd., Shenzhen (CN)

(72) Inventor: Binxuan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 18/329,878

(22) Filed: Jun. 6, 2023

(65) Prior Publication Data

US 2023/0318971 A1 Oct. 5, 2023

Related U.S. Application Data

(63) Continuation of application No. PCT/CN2021/133526, filed on Nov. 26, 2021.

(30) Foreign Application Priority Data

Dec. 8, 2020 (CN) .......................... 202011443680.6

(51) Int. Cl.
*H04L 45/00* (2022.01)
*H04L 45/28* (2022.01)
*H04L 45/42* (2022.01)

(52) U.S. Cl.
CPC ............ *H04L 45/566* (2013.01); *H04L 45/28* (2013.01); *H04L 45/42* (2013.01)

(58) Field of Classification Search
CPC ....... H04L 45/566; H04L 45/28; H04L 45/42; H04L 45/22; H04L 45/302; H04L 45/34; H04L 45/50; H04L 45/74
See application file for complete search history.

(56) References Cited

U.S. PATENT DOCUMENTS

| | | |
|---|---|---|
| 6,496,503 B1 | 12/2002 | Pelissier et al. |
| 2002/0024974 A1 | 2/2002 | Karagiannis et al. |
| 2019/0253341 A1* | 8/2019 | Timmons .............. H04L 45/123 |

OTHER PUBLICATIONS

Ziqiang Li et al:"Segment Routing in Hybrid Software-Defined Networking."978-1-5090-3822-0/17/$31.00 2017 IEEE. May 6-8, 2017. total 6 pages.
Xiaoqian Li et al:"Fast Reroute in Hybrid Segment Routing Network."978-1-7281-3893-0/20/$31.00 2020 IEEE. Jan. 10-13, 2020. total 6 pages.

* cited by examiner

*Primary Examiner* — El Hadji M Sall
(74) *Attorney, Agent, or Firm* — Conley Rose, P.C.

(57) ABSTRACT

A packet transmission system includes a source end device that is configured to send a first packet, where the first packet carries first source routing information and a destination identifier. The first source routing information includes a port identifier of each network device on a first forwarding path, and the destination identifier indicates the destination end device. A first network device on the first forwarding path is configured to, when receiving the first packet, forward the first packet based on the first source routing information or the destination identifier, and forward the first packet based on the first source routing information based on a preference.

20 Claims, 13 Drawing Sheets

PACKET TRANSMISSION METHOD, DEVICE, AND SYSTEM

CROSS-REFERENCE TO RELATED APPLICATIONS

This application is a continuation application of International Patent Application No. PCT/CN2021/133526, filed on Nov. 26, 2021, which claims priority to Chinese Patent Application No. 202011443680.6, filed on Dec. 8, 2020. The disclosures of the aforementioned applications are hereby incorporated by reference in their entireties.

TECHNICAL FIELD

This application relates to the field of network technologies, and in particular, to a packet transmission method, device, and system.

BACKGROUND

A packet transmission system usually includes a communication network and an access device that accesses the communication network. In the communication network, there are a plurality of network devices. The network device implements communication between different access devices by forwarding packets of the different access devices. For example, the access devices that access the communication network may include a source end device and a destination end device, and the network device in the communication network may forward a packet of the source end device to the destination end device, to implement communication between the source end device and the destination end device.

At present, the packet transmission system includes two forwarding manners, namely, a source routing forwarding manner and a forwarding table forwarding manner. In the source routing forwarding manner, the packet sent by the source end device carries source routing information, and the source routing information includes a port identifier of each network device on a forwarding path from the source end device to the destination end device. After receiving the packet, each network device on the forwarding path determines an egress port of the packet based on the port identifier of the network device carried in the packet, and forwards the packet through the egress port of the packet. In the forwarding table forwarding manner, the packet sent by the source end device carries a destination identifier (for example, an address of a destination end device). After receiving the packet, each network device looks up a local forwarding table based on the destination identifier carried in the packet, to determine an egress port of the packet from ports of the network device, and forwards the packet through the egress port of the packet.

However, in the source routing forwarding manner, when the forwarding path is faulty, the network device on the forwarding path usually discards the packet or returns the packet to the source end device, so that the source end device reselects a path for the packet. However, discarding the packet causes poor reliability of packet transmission, and returning the packet to the source end device to reselect the path causes a long transmission delay of the packet. In the forwarding table forwarding manner, it takes long time for the network device to look up the local forwarding table to determine the egress port of the packet, causing a long transmission delay of the packet. Therefore, flexibility and reliability of a current packet transmission solution are poor.

SUMMARY

This application provides a packet transmission method, device, and system, to improve flexibility and reliability of packet transmission. The technical solutions of this application are as follows.

According to a first aspect, a packet transmission system is provided, including a source end device, a destination end device, and a plurality of network devices.

The source end device is configured to send a first packet, where the first packet carries first source routing information and a destination identifier. The first source routing information includes a port identifier of each network device on a first forwarding path, and the destination identifier indicates the destination end device. A first network device on the first forwarding path is configured to, when receiving the first packet, forward the first packet based on the first source routing information or the destination identifier, and preferentially forward the first packet based on the first source routing information.

In the technical solution provided in this application, because the first packet sent by the source end device carries the first source routing information and the destination identifier, after receiving the first packet, the first network device on the first forwarding path forwards the first packet based on the first source routing information or the destination identifier, and preferentially forwards the first packet based on the first source routing information. In this way, if the first forwarding path is not faulty, the first network device may forward the first packet based on the first source routing information. This helps shorten a transmission delay of the first packet from the source end device to the destination end device. If the first forwarding path is faulty because an egress port indicated by the port identifier in the first source routing information is in a non-working state, the first network device may forward the first packet based on the destination identifier. This helps avoid a first packet loss caused because the first forwarding path is faulty. According to the technical solutions provided in this application, a packet loss rate can be reduced and a transmission delay of a packet can be shortened, to help improve flexibility and reliability of packet transmission.

Optionally, the first network device is configured to forward the first packet based on the first source routing information if the first packet satisfies a source routing forwarding condition, or forward the first packet based on the destination identifier if the first packet does not satisfy the source routing forwarding condition but satisfies a forwarding table forwarding condition.

According to the technical solutions provided in this application, the first network device forwards the first packet in different forwarding manners when the first packet satisfies different forwarding conditions, to help improve transmission flexibility of the first packet.

Optionally, an encapsulation type of the first packet is source routing encapsulation, the first packet further carries a source routing validity identifier, and the source routing validity identifier indicates that source routing encapsulated in the first packet is valid or invalid. For example, the first packet further carries a source routing type (type), and the source routing type indicates that the encapsulation type of the first packet is the source routing encapsulation.

Optionally, the source routing forwarding condition includes that the source routing validity identifier indicates that the source routing encapsulated in the first packet is valid, and an egress port indicated by a port identifier of the first network device in the first source routing information is in a working state, for example, in an UP state. The source routing validity identifier carried in the first packet sent by the source end device usually indicates that the source routing encapsulated in the first packet is valid.

Optionally, the forwarding table forwarding condition includes that the source routing validity identifier indicates that the source routing encapsulated in the first packet is invalid. If the first packet received by the first network device satisfies the forwarding table forwarding condition, the first packet may be forwarded to the first network device by using another network device on the first forwarding path, and the first network device is usually not an ingress (ingress) device of the first forwarding path. When determining that a port indicated by a port identifier of the another network device in the first source routing information carried in the first packet is in a non-working state, the another network device modifies the source routing validity identifier carried in the first packet, so that a modified source routing validity identifier indicates that the source routing encapsulated in the first packet is invalid.

Optionally, the forwarding table forwarding condition includes that the source routing validity identifier indicates that the source routing encapsulated in the first packet is valid, but an egress port indicated by a port identifier of the first network device in the first source routing information is in a non-working state, for example, in a DOWN state. If the first packet received by the first network device satisfies the forwarding table forwarding condition, the first network device may be an ingress device or another device of the first forwarding path.

Optionally, the forwarding table forwarding condition includes that the source routing validity identifier indicates that the source routing encapsulated in the first packet is valid, but an egress port indicated by a port identifier of the first network device in the first source routing information is in a non-working state. The first network device is configured to, if the first packet does not satisfy the source routing forwarding condition but satisfies the forwarding table forwarding condition, set the source routing validity identifier to indicate that the source routing encapsulated in the first packet is invalid, and forward the first packet based on the destination identifier.

According to the technical solutions provided in this application, when the egress port indicated by the port identifier of the first network device in the first source routing information is in a non-working state, the first network device sets the source routing validity identifier carried in the first packet to indicate that the source routing encapsulated in the first packet is invalid, so that after receiving the first packet subsequently, another network device can determine that the first packet does not satisfy the source routing forwarding condition, and forward the first packet based on the destination identifier carried in the first packet.

Optionally, the forwarding table forwarding condition includes that the source routing validity identifier indicates that the source routing encapsulated in the first packet is valid, but an egress port indicated by a port identifier of the first network device in the first source routing information is in a non-working state. The first network device is further configured to, if the first packet does not satisfy the source routing forwarding condition but satisfies the forwarding table forwarding condition, send a fault notification message to the source end device. The fault notification message indicates that the first forwarding path is faulty.

According to the technical solutions provided in this application, the first network device sends the fault notification message to the source end device when the source routing validity identifier carried in the first packet indicates that the source routing encapsulated in the first packet is valid, but the egress port indicated by the port identifier of the first network device in the first source routing information carried in the first packet is in a non-working state, to notify the source end device that the first forwarding path is faulty, so that the source end device can learn that the first forwarding path is faulty.

Optionally, the source end device is further configured to, after receiving the fault notification message, set the first forwarding path as an invalid forwarding path.

According to the technical solutions provided in this application, after receiving the fault notification message for indicating that the first forwarding path is faulty, the source end device sets the first forwarding path as the invalid forwarding path based on the fault notification message, to avoid that the source end device selects the faulty first forwarding path when subsequently performing source routing for a packet.

Optionally, the source end device is further configured to, after receiving the fault notification message, send a second packet. The second packet carries second source routing information and the destination identifier, and the second source routing information includes a port identifier of each network device on a second forwarding path. A second network device on the second forwarding path is configured to, when receiving the second packet, forward the second packet based on the second source routing information or the destination identifier, and preferentially forward the second packet based on the second source routing information.

According to the technical solutions provided in this application, after the source end device receives the fault notification message for indicating that the first forwarding path is faulty, a source routing path selected by the source end device for the second packet is the second forwarding path different from the first forwarding path. The source end device selects the second forwarding path to send, to the destination end device, the second packet carrying the second source routing information and the destination identifier, so that flexibility and reliability of second packet transmission can be improved. For example, if the second forwarding path is not faulty, the second network device on the second forwarding path may forward the second packet based on the second source routing information. This helps shorten a transmission delay of the second packet from the source end device to the destination end device. If the second forwarding path is faulty because an egress port indicated by a port identifier in the second source routing information is in a non-working state, the second network device may forward the second packet based on the destination identifier. This helps avoid a second packet loss caused because the second forwarding path is faulty.

Optionally, the source end device is configured to, when satisfying a source routing encapsulation condition, send the first packet. The source routing encapsulation condition includes that both the source end device and the destination end device support a source routing encapsulation function, and network devices on the first forwarding path support a source routing forwarding function. A network device generally supports a forwarding table forwarding function, and an access device generally supports an Ethernet encapsulation function. If the network device supports a source routing forwarding function, the network device supports both the source routing forwarding function and the forwarding table forwarding function. If the access device supports a source routing encapsulation function, the access device supports both the source routing encapsulation function and the Ethernet encapsulation function. In this application, a network device that supports both the source routing forwarding function and the forwarding table forwarding function may be referred to as a dual-mode forwarding device, and a network device that supports only the forwarding table forwarding function but does not support the source routing forwarding function is referred to as a single-mode forwarding device. An access device that supports both the source routing encapsulation function and the Ethernet encapsulation function is referred to as a dual-mode access device, and an access device that supports only the Ethernet encapsulation function is referred to as a single-mode access device.

According to the technical solutions provided in this application, the source end device sends the first packet in a case in which both the source end device and the destination end device support the source routing encapsulation function (that is, both the source end device and the destination end device are dual-mode access devices), and the network devices on the first forwarding path support the source routing forwarding function (that is, the network devices on the first forwarding path are dual-mode forwarding devices), so that the first packet can be forwarded to the destination end device in a source routing forwarding manner, and the destination end device can parse the first packet.

Optionally, the source end device is further configured to, when not satisfying the source routing encapsulation condition, send a third packet, where the third packet carries the destination identifier, and an encapsulation type of the third packet is Ethernet encapsulation. If the source routing encapsulation condition is not satisfied, the destination end device is a single-mode access device, and/or the first forwarding path includes a single-mode forwarding device, and the source end device is usually a dual-mode access device, so that the source end device has a function of determining whether to satisfy the source routing encapsulation condition, to determine whether to send a source routing packet or send an Ethernet packet.

According to the technical solutions provided in this application, the source end device sends the third packet when not satisfying the source routing encapsulation condition. The third packet is the Ethernet packet. Therefore, it can be ensured that the packet transmission method provided in this application is compatible with a conventional Ethernet packet transmission method.

Optionally, the source end device is further configured to, before sending the first packet, determine the first forwarding path based on a path table of the source end device. The path table includes at least one path entry related to the destination end device, and each of the at least one path entry indicates one forwarding path between the source end device and the destination end device.

According to the technical solutions provided in this application, the source end device determines the first forwarding path before sending the first packet, so that the first packet generated by the source end device carries the first source routing information to indicate the first forwarding path.

Optionally, the source end device is further configured to, before determining the first forwarding path based on the path table of the source end device, construct the path table based on a network topology of the packet transmission system, or receive the path table from a control device.

According to the technical solutions provided in this application, the source end device constructs the path table or receives the path table from the control device, so that the source end device can determine the first forwarding path based on the path table.

Optionally, before forwarding the first packet based on the destination identifier, the first network device is further configured to, construct a forwarding table based on the network topology of the packet transmission system, or receive the forwarding table from the control device. The forwarding table includes at least one forwarding entry, and each of the at least one forwarding entry indicates a mapping relationship between one destination identifier and one port of the first network device.

According to the technical solutions provided in this application, the first network device constructs the forwarding table or receives the forwarding table from the control device, so that the first network device can determine an egress port of the first packet based on the destination identifier carried in the first packet and the path table.

Optionally, the first network device is configured to, when receiving the first packet, if the first packet satisfies the source routing forwarding condition but a first-hop device of the first network device does not support the source routing forwarding function, forward the first packet based on the destination identifier carried in the first packet, where the first-hop device is a next-hop device of the first network device.

The first-hop device is configured to, when receiving the first packet, forward the first packet based on the destination identifier carried in the first packet.

A second-hop device of the first network device is configured to, when receiving the first packet, if the first packet satisfies the source routing forwarding condition and a third-hop device of the first network device supports the source routing forwarding function, forward the first packet based on the first source routing information carried in the first packet, where the second-hop device is a next-hop device of the first-hop device, and the third-hop device is a next-hop device of the second-hop device.

According to the technical solutions provided in this application, when the first packet satisfies the source routing forwarding condition but the first-hop device of the first network device does not support the source routing forwarding function, the first network device forwards the first packet based on the destination identifier carried in the first packet. After the first-hop device forwards the first packet to the second-hop device of the first network device based on the destination identifier carried in the first packet, when the first packet satisfies the source routing forwarding condition and the next-hop device of the second-hop device supports the source routing forwarding function, the second-hop device forwards the first packet based on the first source routing information carried in the first packet. The packet forwarding manner is applied to a scenario in which a forwarding path includes a device that does not support a source routing forwarding function, and has better universal applicability in a communication network.

According to a second aspect, a packet transmission method is provided, and is applied to a source end device. The method includes sending a first packet, where the first packet carries first source routing information and a destination identifier, the first source routing information includes a port identifier of each network device on a first forwarding path, and the destination identifier indicates a destination end device, so that a first network device on the first forwarding path forwards the first packet based on the first source routing information or the destination identifier, and the first network device preferentially forwards the first packet based on the first source routing information.

Optionally, an encapsulation type of the first packet is source routing encapsulation, the first packet further carries a source routing validity identifier, and the source routing validity identifier indicates that source routing encapsulated in the first packet is valid or invalid.

Optionally, the method further includes, after sending the first packet, if receiving a fault notification message indicating that the first forwarding path is faulty, setting the first forwarding path as an invalid forwarding path.

Optionally, the method further includes, after sending the first packet, if receiving the fault notification message indicating that the first forwarding path is faulty, sending a second packet. The second packet carries second source routing information and the destination identifier, and the second source routing information includes a port identifier of each network device on a second forwarding path, so that a second network device on the second forwarding path forwards the second packet based on the second source routing information or the destination identifier, and the second network device preferentially forwards the second packet based on the second source routing information.

Optionally, the sending a first packet includes, when satisfying a source routing encapsulation condition, sending the first packet. The source routing encapsulation condition includes that both the source end device and the destination end device support a source routing encapsulation function, and network devices on the first forwarding path support a source routing forwarding function.

Optionally, the method further includes, when not satisfying the source routing encapsulation condition, sending a third packet, where the third packet carries the destination identifier, and an encapsulation type of the third packet is Ethernet encapsulation.

Optionally, the method further includes, before sending the first packet, determining the first forwarding path based on a path table of the source end device, where the path table includes at least one path entry related to the destination end device, and each of the at least one path entry indicates one forwarding path between the source end device and the destination end device.

Optionally, the method further includes, before determining the first forwarding path based on the path table of the source end device, constructing the path table based on a network topology of a packet transmission system, or receiving the path table from a control device.

For technical effects of the second aspect and the optional implementations of the second aspect, refer to the technical effects of the first aspect and the optional implementations of the first aspect. Details are not described herein again.

According to a third aspect, a packet transmission method is provided, and is applied to a target network device. The method includes, when receiving a first packet carrying first source routing information and a destination identifier, forwarding the first packet based on the first source routing information or the destination identifier, and preferentially forwarding the first packet based on the first source routing information. The first source routing information includes a port identifier of each network device on a first forwarding path, and the destination identifier indicates a destination end device.

Optionally, the forwarding the first packet based on the first source routing information or the destination identifier, and preferentially forwarding the first packet based on the first source routing information includes forwarding the first packet based on the first source routing information if the first packet satisfies a source routing forwarding condition; or forwarding the first packet based on the destination identifier if the first packet does not satisfy a source routing forwarding condition but satisfies a forwarding table forwarding condition.

Optionally, an encapsulation type of the first packet is source routing encapsulation, the first packet further carries a source routing validity identifier, and the source routing validity identifier indicates that source routing encapsulated in the first packet is valid or invalid.

Optionally, the source routing forwarding condition includes that the source routing validity identifier indicates that the source routing encapsulated in the first packet is valid, and an egress port indicated by a port identifier of the target network device in the first source routing information is in a working state.

Optionally, the forwarding table forwarding condition includes that the source routing validity identifier indicates that the source routing encapsulated in the first packet is invalid.

Optionally, the forwarding table forwarding condition includes that the source routing validity identifier indicates that the source routing encapsulated in the first packet is valid, but an egress port indicated by a port identifier of the target network device in the first source routing information is in a non-working state.

Optionally, the forwarding table forwarding condition includes that the source routing validity identifier indicates that the source routing encapsulated in the first packet is valid, but an egress port indicated by a port identifier of the target network device in the first source routing information is in a non-working state; and if the first packet does not satisfy the source routing forwarding condition but satisfies the forwarding table forwarding condition, the forwarding the first packet based on the destination identifier includes, if the first packet does not satisfy the source routing forwarding condition but satisfies the forwarding table forwarding condition, setting the source routing validity identifier to indicate that the source routing encapsulated in the first packet is invalid; and forwarding the first packet based on the destination identifier.

Optionally, the forwarding table forwarding condition includes that the source routing validity identifier indicates that the source routing encapsulated in the first packet is valid, but an egress port indicated by a port identifier of the target network device in the first source routing information is in a non-working state; and the method further includes, if the first packet does not satisfy the source routing forwarding condition but satisfies the forwarding table forwarding condition, sending a fault notification message to a source end device, where the fault notification message indicates that the first forwarding path is faulty.

Optionally, the method further includes, when receiving a second packet carrying second source routing information and the destination identifier, forwarding the second packet based on the second source routing information or the destination identifier, and preferentially forwarding the second packet based on the second source routing information, where the second source routing information includes a port identifier of each network device on a second forwarding path.

Optionally, the method further includes, before forwarding the first packet based on the destination identifier, constructing a forwarding table based on a network topology of a packet transmission system, or receiving the forwarding table from a control device. The forwarding table includes at least one forwarding entry, and each of the at least one forwarding entry indicates a mapping relationship between one destination identifier and one port of the target network device.

Optionally, the method further includes, when receiving a third packet carrying the destination identifier, forwarding the third packet based on the destination identifier, where an encapsulation type of the third packet is Ethernet encapsulation.

Optionally, the forwarding the first packet based on the first source routing information or the destination identifier, and preferentially forwarding the first packet based on the first source routing information includes, if the first packet satisfies a source routing forwarding condition but a next-hop device of a first network device does not support a source routing forwarding function, forwarding the first packet based on the destination identifier carried in the first packet; or if the first packet satisfies a source routing forwarding condition and a next-hop device of a first network device supports a source routing forwarding function, forwarding the first packet based on the first source routing information carried in the first packet.

Optionally, the target network device is a first network device or a second network device.

For technical effects of the third aspect and the optional implementations of the third aspect, refer to the technical effects of the first aspect and the optional implementations of the first aspect. Details are not described herein again.

According to a fourth aspect, a source end device is provided, where the source end device includes a sending module, configured to send a first packet, where the first packet carries first source routing information and a destination identifier, the first source routing information includes a port identifier of each network device on a first forwarding path, and the destination identifier indicates a destination end device, so that a first network device on the first forwarding path forwards the first packet based on the first source routing information or the destination identifier, and the first network device preferentially forwards the first packet based on the first source routing information.

Optionally, an encapsulation type of the first packet is source routing encapsulation, the first packet further carries a source routing validity identifier, and the source routing validity identifier indicates that source routing encapsulated in the first packet is valid or invalid.

Optionally, the source end device further includes a setting module, configured to, after the first packet is sent, if a fault notification message indicating that the first forwarding path is faulty is received, set the first forwarding path as an invalid forwarding path.

Optionally, the sending module is further configured to, after sending the first packet, if the fault notification message indicating that the first forwarding path is faulty is received, send a second packet. The second packet carries second source routing information and the destination identifier, and the second source routing information includes a port identifier of each network device on a second forwarding path, so that a second network device on the second forwarding path forwards the second packet based on the second source routing information or the destination identifier, and the second network device preferentially forwards the second packet based on the second source routing information.

Optionally, the sending module is configured to, when a source routing encapsulation condition is satisfied, send the first packet. The source routing encapsulation condition includes that both the source end device and the destination end device support a source routing encapsulation function, and the network devices on the first forwarding path support a source routing forwarding function.

Optionally, the sending module is further configured to, when the source routing encapsulation condition is not satisfied, send a third packet, where the third packet carries the destination identifier, and an encapsulation type of the third packet is Ethernet encapsulation.

Optionally, the source end device further includes a determining module, configured to, before the first packet is sent, determine the first forwarding path based on a path table of the source end device. The path table includes at least one path entry related to the destination end device, and each of the at least one path entry indicates one forwarding path between the source end device and the destination end device.

Optionally, the source end device further includes a construction module, configured to construct the path table based on a network topology of a packet transmission system before the first forwarding path is determined based on the path table of the source end device; or a receiving module, configured to receive the path table from a control device before the first forwarding path is determined based on the path table of the source end device.

For technical effects of the fourth aspect and the optional implementations of the fourth aspect, refer to the technical effects of the first aspect and the optional implementations of the first aspect. Details are not described herein again.

According to a fifth aspect, a target network device is provided. The target network device includes a forwarding module, configured to, when a first packet carrying first source routing information and a destination identifier is received, forward the first packet based on the first source routing information or the destination identifier, and preferentially forward the first packet based on the first source routing information. The first source routing information includes a port identifier of each network device on a first forwarding path, and the destination identifier indicates a destination end device.

Optionally, the forwarding module is configured to forward the first packet based on the first source routing information if the first packet satisfies a source routing forwarding condition; and forward the first packet based on the destination identifier if the first packet does not satisfy a source routing forwarding condition but satisfies a forwarding table forwarding condition.

Optionally, an encapsulation type of the first packet is source routing encapsulation, the first packet further carries a source routing validity identifier, and the source routing validity identifier indicates that source routing encapsulated in the first packet is valid or invalid.

Optionally, the source routing forwarding condition includes that the source routing validity identifier indicates that the source routing encapsulated in the first packet is valid, and an egress port indicated by a port identifier of the target network device in the first source routing information is in a working state.

Optionally, the forwarding table forwarding condition includes that the source routing validity identifier indicates that the source routing encapsulated in the first packet is invalid.

Optionally, the forwarding table forwarding condition includes that the source routing validity identifier indicates that the source routing encapsulated in the first packet is valid, but an egress port indicated by a port identifier of the target network device in the first source routing information is in a non-working state.

Optionally, the forwarding table forwarding condition includes that the source routing validity identifier indicates that the source routing encapsulated in the first packet is valid, but an egress port indicated by a port identifier of the target network device in the first source routing information is in a non-working state; and the forwarding module is configured to, if the first packet does not satisfy the source routing forwarding condition but satisfies the forwarding table forwarding condition, set the source routing validity identifier to indicate that the source routing encapsulated in the first packet is invalid; and forward the first packet based on the destination identifier.

Optionally, the forwarding table forwarding condition includes that the source routing validity identifier indicates that the source routing encapsulated in the first packet is valid, but an egress port indicated by a port identifier of the target network device in the first source routing information is in a non-working state; and the target network device further includes a sending module, configured to, if the first packet does not satisfy the source routing forwarding condition but satisfies the forwarding table forwarding condition, send a fault notification message to a source end device, where the fault notification message indicates that the first forwarding path is faulty.

Optionally, the forwarding module is further configured to, when a second packet carrying second source routing information and the destination identifier is received, forward the second packet based on the second source routing information or the destination identifier, and preferentially forward the second packet based on the second source routing information, where the second source routing information includes a port identifier of each network device on a second forwarding path.

Optionally, the target network device further includes a construction module, configured to, before the forwarding module forwards the first packet based on the destination identifier, construct a forwarding table based on a network topology of a packet transmission system; or a receiving module, configured to, before the forwarding module forwards the first packet based on the destination identifier, receive a forwarding table from a control device. The forwarding table includes at least one forwarding entry, and each of the at least one forwarding entry indicates a mapping relationship between one destination identifier and one port of the target network device.

Optionally, the forwarding module is further configured to, when a third packet carrying the destination identifier is received, forward the third packet based on the destination identifier, where an encapsulation type of the third packet is Ethernet encapsulation.

Optionally, the target network device is a first network device or a second network device.

For technical effects of the fifth aspect and the optional implementations of the fifth aspect, refer to the technical effects of the first aspect and the optional implementations of the first aspect. Details are not described herein again.

According to a sixth aspect, a communication device is provided, including a memory and a processor.

The memory is configured to store a computer program.

The processor is configured to execute the computer program stored in the memory to perform the packet transmission method provided in any one of the second aspect or the optional manners of the second aspect, or perform the packet transmission method provided in any one of the third aspect or the optional manners of the third aspect.

Optionally, the communication device is a server or a target network device, and the target network device is the first network device or the second network device.

According to a seventh aspect, a computer-readable storage medium is provided. The computer-readable storage medium stores a computer program. When the computer program is executed by a processor, the packet transmission method provided in any one of the second aspect or the optional manners of the second aspect is implemented, or the packet transmission method provided in any one of the third aspect or the optional manners of the third aspect is implemented.

According to an eighth aspect, a computer program product including instructions is provided. When the computer program product is run on a computer, the computer is enabled to perform the packet transmission method according to any one of the second aspect or the optional manners of the second aspect, or perform the packet transmission method according to any one of the third aspect or the optional manners of the third aspect.

According to a ninth aspect, a chip is provided. The chip includes a programmable logic circuit and/or program instructions. When the chip is run, the chip is configured to implement the packet transmission method according to any one of the second aspect or the optional manners of the second aspect, or implement the packet transmission method according to any one of the third aspect or the optional manners of the third aspect.

According to a tenth aspect, a packet transmission system is provided, including a source end device and a target network device.

The source end device is the source end device provided in the fourth aspect, and the target network device is the target network device provided in the fifth aspect; or at least one of the source end device and the target network device is the device provided in the sixth aspect.

Optionally, the source end device is a server, and the target network device is the first network device or the second network device.

The technical solutions provided in this application bring the following beneficial effects.

This application provides a packet transmission method, device, and system. The packet transmission system includes a source end device, a destination end device, and a plurality of network devices. A packet sent by the source end device carries source routing information and a destination identifier. The source routing information includes a port identifier of each network device on a forwarding path. The destination identifier indicates the destination end device. After receiving the packet, the network device on the forwarding path forwards the packet based on the source routing information or the destination identifier, and preferentially forwards the packet based on the source routing information. Therefore, if the forwarding path is not faulty, the network device on the forwarding path may forward the packet based on the source routing information. This helps shorten a transmission delay of the packet from the source end device to the destination end device. If the forwarding path is faulty because an egress port indicated by the port identifier in the source routing information is in a non-working state, the network device on the forwarding path may forward the packet based on the destination identifier. This helps avoid a packet loss caused because the forwarding path is faulty. According to the technical solutions provided in this application, a packet loss rate can be reduced and a transmission delay of a packet can be shortened, to help improve flexibility and reliability of packet transmission.

DESCRIPTION OF EMBODIMENTS

To make the principles, technical solutions, and advantages of this application clearer, the following further describes implementations of this application in detail with reference to the accompanying drawings.

It should be understood that, in a process in which a network device forwards a packet, the network device may generally process the packet, for example, process some control information in a packet header. However, the network device usually does not change key content of the packet. The key content is, for example, but is not limited to, a packet payload. In view of this, in this application, for ease of description, a packet received by the network device and a packet forwarded by the network device are described by using a same name. For example, in the following embodiments, in a description similar to "When receiving a first packet, a first network device forwards the first packet based on first source routing information or a destination identifier carried in the first packet", both a packet received by the first network device and a packet forwarded by the first network device are referred to as a first packet. It may be understood that the first packet received by the first network device and the first packet forwarded by the first network device have same key content, and control information in a packet header may be different. Descriptions of a second packet and a third packet are similar.

Before embodiments of this application are described in detail, an implementation environment of this application is first described.

The implementation environment of the technical solutions provided in this application is a communication system, and the communication system may be a packet transmission system. The packet transmission system may include a communication network and an access device that accesses the communication network. In the communication network, there are a plurality of network devices. The network device implements communication between different access devices by forwarding packets of the different access devices. The communication network may be a data center network (data center network, DCN), a metropolitan area network, a wide area network, a campus network, or the like. A type of the communication network is not limited in embodiments of this application. In some implementation scenarios, the communication network may also be referred to as a computing network, for example, a high performance computing (high performance computing, HPC) network. Optionally, based on different network topologies, the communication network may be a 2-level Clos network or a 3-level Clos network, and the 2-level Clos network may also be referred to as a 2-level fat-tree network. This is not limited in embodiments of this application.

Figure 1:
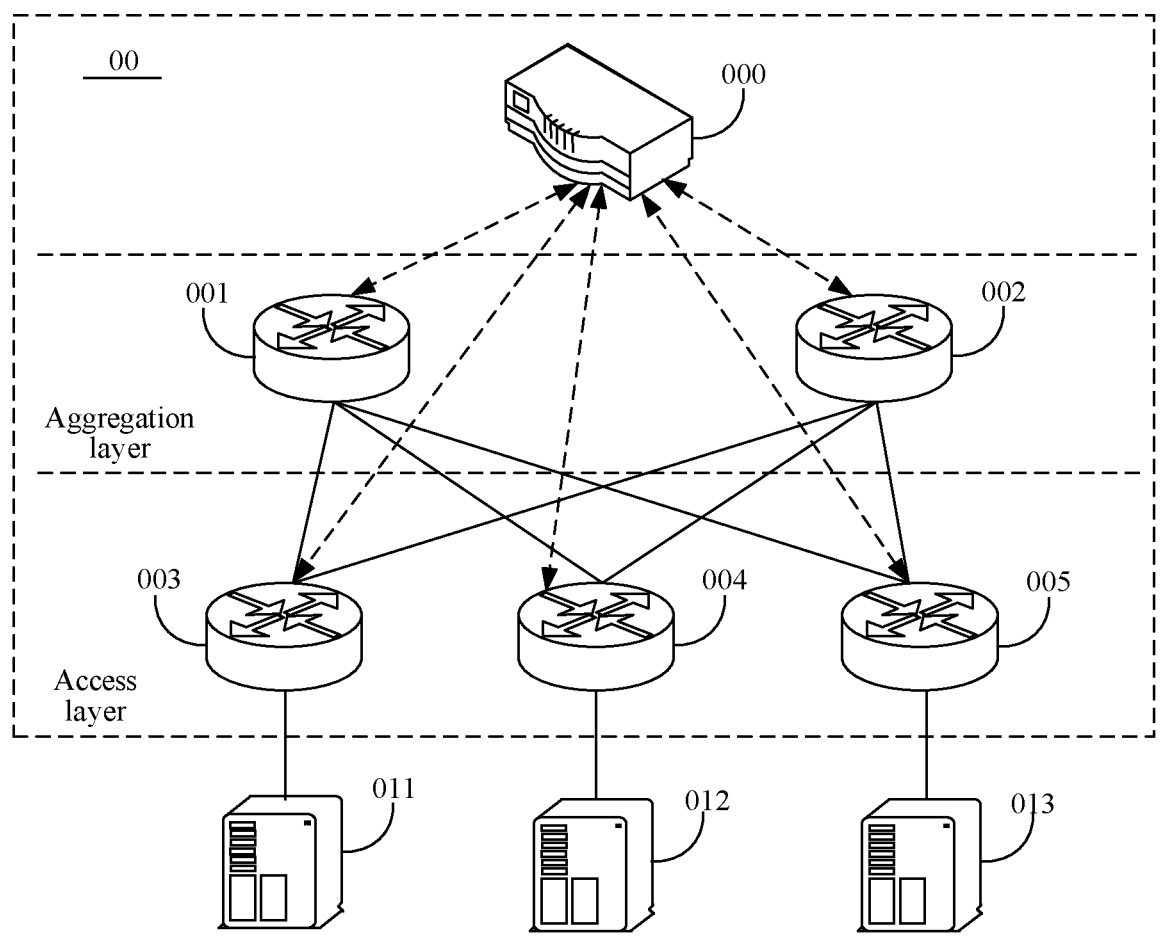
FIG. 1 is a schematic diagram of an implementation environment according to an embodiment of this application.

For example, FIG. 1 is a schematic diagram of an implementation environment according to an embodiment of this application. The implementation environment provides a packet transmission system. The packet transmission system includes a communication network 00 and access devices 011 to 013 that access the communication network 00. The communication network includes a plurality of network devices 001 to 005. The network devices 001 to 005 implement communication between the access devices 011 to 013 by forwarding packets of the access devices 011 to 013.

Each network device in the network devices 001 to 005 may be a device that is configured to forward a packet in the communication network, such as a switch, a router (router), a virtual switch, or a virtual router. The network devices 001 to 005 may be same network devices. For example, all the network devices 001 to 005 may be switches. Alternatively, the network devices 001 to 005 may be different network devices. For example, some of the network devices 001 to 005 are switches, and the other are routers.

Each access device in the access devices 011 to 013 may be various types of devices such as a host, a terminal, a server, or a virtual machine. The access devices 011 to 013 may be devices of a same type. For example, all the access devices 011 to 013 may be servers. Alternatively, the access devices 011 to 013 may be devices of different types. For example, the access device 011 is a server, the access device 012 is a terminal, and the access device 013 is a virtual machine. The terminal may include a smartphone, a tablet computer, a desktop computer, an internet of things (internet of things, IoT) device, or the like. The IoT device may be a home appliance, a smart household, a vehicle, a tool device, a service device, a service facility, a wearable device, or the like. The IoT device is, for example, but is not limited to, a smart refrigerator, a smart washing machine, a smart water meter, a smart electric meter, a smart car, an in-vehicle device, a wearable device, or the like.

Optionally, as shown in FIG. 1, the communication network 00 further includes a control device 000. The control device 000 is in a communication connection with the network devices 001 to 005, and the control device 000 may further be in a communication connection with the access devices 011 to 013 (not shown in FIG. 1). To facilitate distinguishing between communication connections between the different network devices and communication connections between the network devices and the access devices, FIG. 1 shows communication connections between the control device 000 and the network devices 001 to 005 in a form of dashed lines. The control device 000 is configured to manage the network devices 001 to 005 and the access devices 011 to 013. The network devices 001 to 005 may forward packets under control of the control device 000, and the access devices 011 to 013 may receive and send packets under control of the control device 000. The control device 000 may perform network topology collection, resource allocation, path calculation, and forwarding table calculation, push path information to the access devices 011 to 013, and push forwarding tables to the network devices 001 to 005. The access devices 011 to 013 receive and send the packets based on the path information pushed by the control device 000, and the network devices 001 to 005 may forward the packets based on the forwarding tables pushed by the control device 000. The control device 000 may be a controller, and may be a server, a terminal, or a forwarding device (a switch, a router, a virtual switch, a virtual router, or the like). If the control device 000 is a forwarding device, the control device 000 may be a specified network device (for example, a network device manually specified) in the communication network, or a device selected from the plurality of network devices in the communication network in an election manner.

Optionally, as shown in FIG. 1, the communication network 00 includes an aggregation layer and an access layer, the network devices 001 and 002 are located at the aggregation layer, and the network devices 003 to 005 are located at the access layer. The access device 011 accesses the communication network 00 by using the network device 003, the access device 012 accesses the communication network 00 by using the network device 004, and the access device 013 accesses the communication network 00 by using the network device 005. A person skilled in the art easily understands that the communication network 00 shown in FIG. 1 may be a 2-level Clos network, and may also be referred to as a leaf-spine (leaf-spine) topology network. The network devices 001 and 002 located at the aggregation layer may be spine (spine) devices, and the network devices 003 to 005 located at the access layer may be leaf (leaf) devices. Each spine device is connected to all leaf devices, and each leaf device is connected to all spine devices (that is, the spine devices are fully interconnected with the leaf devices).

A person skilled in the art should understand that the packet transmission system shown in FIG. 1 is merely used as an example, but is not used to limit the technical solutions in embodiments of this application. In an implementation process, the packet transmission system may further include another device. A quantity of network devices, a quantity of access devices, a connection relationship between network devices, and a connection relationship between a network device and an access device may be configured as required, and a topology of the communication network may be another topology. For example, the spine devices may not be fully interconnected with the leaf devices. For another example, the network devices at the aggregation layer may be interconnected. For still another example, the communication network may further include a core layer located above the aggregation layer. Details are not described herein in embodiments of this application.

A network device in a communication network implements communication between different access devices by forwarding packets of the different access devices. Based on a packet transmission direction, the access devices may include a source end device (namely, a transmitting end of the packet, where the source end device is usually a constructor of the packet) and a destination end device (namely, a destination end of the packet, where the destination end device is usually a final receiver of the packet). The network device may forward the packet of the source end device to the destination end device. Currently, there are two forwarding manners in a communication network, namely, a source routing forwarding manner and a forwarding table forwarding manner. In the source routing forwarding manner, the packet sent by the source end device carries source routing information, and the source routing information includes a port identifier of each network device on a forwarding path from the source end device to the destination end device. After receiving the packet, each network device determines an egress port of the packet based on the port identifier of the network device carried in the packet, and forwards the packet through the egress port of the packet. In the forwarding table forwarding manner, the packet sent by the source end device carries a destination identifier (for example, an address of the destination end device). After receiving the packet, each network device looks up a local forwarding table based on the destination identifier carried in the packet, to determine an egress port of the packet, and forwards the packet through the egress port of the packet.

However, in the source routing forwarding manner, a forwarding path is determined by the source end device. After the source end device sends the packet, if the forwarding path is faulty, the network device on the forwarding path usually discards the packet or returns the packet to the source end device, so that the source end device reselects a path for the packet. Discarding the packet easily causes poor reliability of packet transmission, and returning the packet to the source end device to reselect the path causes a long transmission delay of the packet, and may cause network congestion. In the forwarding table forwarding manner, because the network device needs to look up the local forwarding table to determine the egress port of the packet, it takes long time for the network device to look up the local forwarding table to determine the egress port of the packet, causing a long transmission delay of the packet. For example, a clock frequency of a chip of the network device is 1 gigahertz (GHz).

It takes 3 to 40 nanoseconds (ns) for each network device to complete table lookup and forwarding once, and it takes up to 100 ns for packet forwarding in three hops. In a most common 2-level fat-tree network in a data center, a transmission delay of a packet from a source end device to a destination end device is up to 100 ns. In dragonfly or dragonfly+topology on large-scale networking, a quantity of hops for the packet from the source end device to the destination end device is 5 to 7. It takes longer time to perform table lookup and forwarding, causing a longer transmission delay of the packet.

In view of this, embodiments of this application provide a packet transmission method, device, and system. The packet transmission system includes a source end device, a destination end device, and a plurality of network devices. A packet sent by the source end device may carry source routing information and a destination identifier. The source routing information includes a port identifier of each network device on a forwarding path. The destination identifier indicates the destination end device. After receiving the packet, the network device on the forwarding path forwards the packet based on the source routing information or the destination identifier, and preferentially forwards the packet based on the source routing information. Therefore, if the forwarding path is not faulty, the network device on the forwarding path may forward the packet based on the source routing information. This helps shorten a transmission delay of the packet from the source end device to the destination end device. If the forwarding path is faulty because an egress port indicated by the port identifier in the source routing information is in a non-working state, the network device on the forwarding path may forward the packet based on the destination identifier. This helps avoid a packet loss caused because the forwarding path is faulty. According to the technical solutions provided in this application, a packet loss rate can be reduced and a transmission delay of a packet can be shortened, to help improve flexibility and reliability of packet transmission. The technical solutions provided in embodiments of this application are particularly applicable to a service that has a high requirement on transmission performance (for example, a transmission delay or a packet loss rate), for example, a service such as artificial intelligence, real-time big data analysis, deep learning, distributed computing, distributed storage, or separation of computing and storage. The following describes detailed implementation solutions of this application with reference to the accompanying drawings.

A packet transmission method provided in an embodiment of this application is first described.

Figure 2:
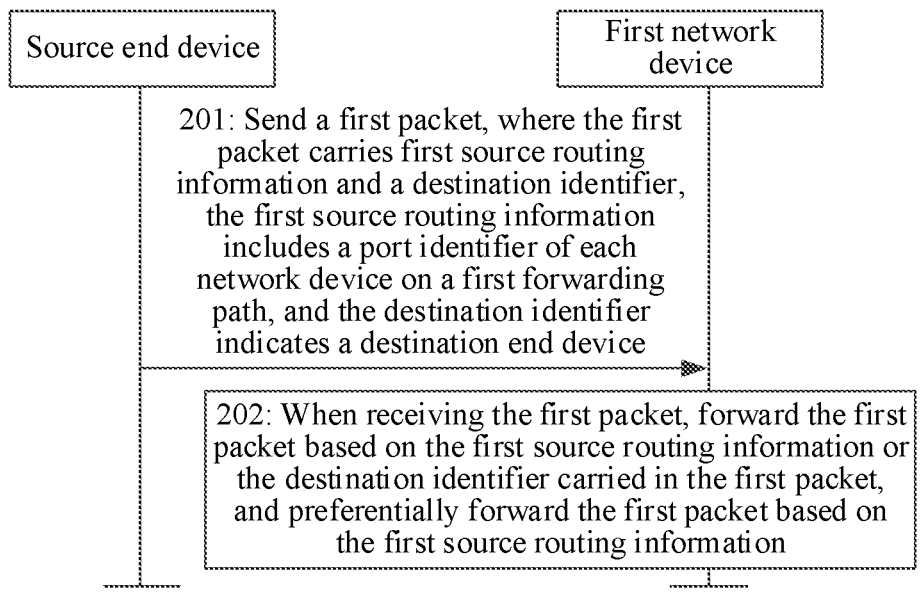
FIG. 2 is a flowchart of a packet transmission method according to an embodiment of this application.

For example, FIG. 2 is a flowchart of a packet transmission method according to an embodiment of this application. The packet transmission method is applied to a packet transmission system, and the packet transmission system may include a source end device, a destination end device, and a plurality of network devices. For example, the packet transmission system may be the packet transmission system shown in FIG. 1. Referring to FIG. 2, the method may include the following steps.

Step 201: The source end device sends a first packet, where the first packet carries first source routing information and a destination identifier, the first source routing information includes a port identifier of each network device on a first forwarding path, and the destination identifier indicates the destination end device.

Optionally, the source end device first determines the first forwarding path between the source end device and the destination end device, and then generates the first packet based on the first forwarding path and the destination end device, so that the first packet carries the first source routing information and the destination identifier. The first source routing information includes the port identifier of each network device on the first forwarding path. The destination identifier indicates the destination end device. For example, the destination identifier may be a device identifier of the destination end device, an internet protocol (Internet Protocol, IP) address of the destination end device, a location identifier (location Identity, LID) of the destination end device, or another identifier for indicating the destination end device. A person skilled in the art may understand that this embodiment of this application is described by using an example in which the first packet carries the port identifier of the network device. In actual application, the first packet may carry any indication information that can indicate a port of the network device. This is not limited in this embodiment of this application.

Optionally, an encapsulation type of the first packet is source routing encapsulation. Therefore, the first packet may be referred to as a source routing packet. The first packet may further carry a source routing validity identifier, and the source routing validity identifier indicates that source routing encapsulated in the first packet is valid or invalid, for example, indicates that first source routing information in the first packet is valid or invalid. For example, a value of the source routing validity identifier may be "1" or "0". "1" indicates that the source routing encapsulated in the first packet is valid and "0" indicates that the source routing encapsulated in the first packet is invalid, or "0" indicates that the source routing encapsulated in the first packet is valid and "1" indicates that the source routing encapsulated in the first packet is invalid. This is not limited in this embodiment of this application. In this embodiment of this application, the source routing validity identifier in the first packet generated by the source end device indicates that the source routing encapsulated in the first packet is valid.

Optionally, the first packet may further carry a source routing type, and the source routing type indicates that the encapsulation type of the first packet is the source routing encapsulation, so that the network device receiving the first packet determines, based on the source routing type, that the encapsulation type of the first packet is the source routing encapsulation. This is not limited in this embodiment of this application. It may be easily understood that the first packet may further carry a packet payload (payload). In this embodiment of this application, the first source routing information, the destination identifier, the source routing validity identifier, and the source routing type may all be carried in a header of the first packet.

After generating the first packet, the source end device may send the first packet. Optionally, that the source end device sends the first packet may be that the source end device sends the first packet to the destination end device through the first forwarding path, and the first packet may be forwarded to the destination end device by using the network device on the first forwarding path. A person skilled in the art easily understands that, when the source end device sends the first packet to the destination end device through the first forwarding path, the 1st network device (namely, an ingress device on the first forwarding path) on the first forwarding path first receives the first packet.

In this embodiment of this application, the source end device maintains a path table. The path table of the source end device includes at least one path entry related to the destination end device. Each path entry indicates a forwarding path between the source end device and the destination end device. When the source end device needs to send a packet to the destination end device, the source end device may determine the first forwarding path from the path table or determine the first forwarding path through path calculation. This is not limited in this embodiment of this application. In this embodiment of this application, an example in which the source end device determines the first forwarding path from the path table is used for description. Before determining the first forwarding path from the path table, the source end device may first obtain the path table. Optionally, the path table may be constructed by the source end device, or may be constructed by a control device and sent to the source end device. Therefore, that the source end device obtains the path table may include that the source end device constructs the path table based on a network topology of the packet transmission system (for example, the packet transmission system shown in FIG. 1), or the source end device receives the path table from the control device (for example, the control device 000 in FIG. 1). This is not limited in this embodiment of this application.

In this embodiment of this application, an example in which the source end device constructs the path table based on the network topology of the packet transmission system is used for description. The source end device may calculate at least one forwarding path between the source end device and the destination end device based on the network topology of the packet transmission system through a path algorithm, construct one path entry based on path information of each forwarding path, and generate the path table based on the at least one path entry constructed based on the at least one forwarding path. A process in which the control device constructs the path table is similar to this. Details are not described herein again in this embodiment of this application. It should be noted that in the packet transmission system, some network devices may support only a forwarding table forwarding function but does not support a source routing forwarding function, some network devices support both the forwarding table forwarding function and the source routing forwarding function, some access devices support only an Ethernet encapsulation function but does not support a source routing encapsulation function, and some access devices support both the Ethernet encapsulation function and the source routing encapsulation function. In this embodiment of this application, the network device that supports both the forwarding table forwarding function and the source routing forwarding function may be referred to as a dual-mode forwarding device, the network device that supports only the forwarding table forwarding function but does not support the source routing forwarding function is referred to as a single-mode forwarding device, the access device that supports both the Ethernet encapsulation function and the source routing encapsulation function is referred to as a dual-mode access device, and the access device that supports only the Ethernet encapsulation function but does not support the source routing encapsulation function is referred to as a single-mode access device. When calculating the forwarding path based on the network topology of the packet transmission system, the control device and/or the access device (for example, the source end device) may remove the single-mode forwarding device and the single-mode access device in the packet transmission system, and calculate the forwarding path based on a network topology formed by the dual-mode forwarding device and the dual-mode access device in the packet transmission system. Optionally, the control device and/or the access device may collect the network topology of the packet transmission system. In a process of collecting the network topology, the control device and/or the access device may identify whether the network device is the dual-mode forwarding device and whether the access device is the dual-mode access device, to remove the single-mode forwarding device and the single-mode access device in the packet transmission system when calculating the forwarding path.

Step 202: When receiving the first packet, a first network device on the first forwarding path forwards the first packet based on the first source routing information or the destination identifier carried in the first packet, and preferentially forwards the first packet based on the first source routing information.

The first network device may be any network device on the first forwarding path. For example, the first network device may be an ingress device, an egress (egress) device, or any transit (transit) device between the ingress device and the egress device on the first forwarding path. This is not limited in this embodiment of this application.

When receiving the first packet, the first network device may determine whether the first packet satisfies a source routing forwarding condition. If the first packet satisfies the source routing forwarding condition, the first network device forwards the first packet based on the first source routing information carried in the first packet. If the first packet does not satisfy the source routing forwarding condition but satisfies a forwarding table forwarding condition, the first network device forwards the first packet based on the destination identifier carried in the first packet. Optionally, the encapsulation type of the first packet is the source routing encapsulation, and the first packet further carries the source routing validity identifier. The source routing forwarding condition may include that the source routing validity identifier carried in the first packet indicates that the source routing encapsulated in the first packet is valid, and an egress port indicated by a port identifier of the first network device in the first source routing information carried in the first packet is in a working state. The forwarding table forwarding condition may include that the source routing validity identifier carried in the first packet indicates that the source routing encapsulated in the first packet is invalid; or the source routing validity identifier carried in the first packet indicates that the source routing encapsulated in the first packet is valid, but the egress port indicated by the port identifier of the first network device in the first source routing information carried in the first packet is in a non-working state.

Optionally, if the first packet satisfies the source routing forwarding condition, the first network device forwards the first packet through the egress port indicated by the port identifier of the first network device in the first source routing information carried in the first packet. If the first packet does not satisfy the source routing forwarding condition but satisfies the forwarding table forwarding condition, the first network device looks up a forwarding table of the first network device based on the destination identifier carried in the first packet, to determine the egress port of the first packet from ports of the first network device, and forwards the first packet through the egress port of the first packet. The forwarding table includes at least one forwarding entry, each forwarding entry indicates a mapping relationship between one destination identifier and one port of the first network device, and the first network device determines a port that is in the forwarding table and that corresponds to the destination identifier carried in the first packet as the egress port of the first packet.

Optionally, if the source routing validity identifier carried in the first packet indicates that the source routing encapsulated in the first packet is valid, but the egress port indicated by the port identifier of the first network device in the first source routing information carried in the first packet is in a non-working state, the first network device may determine that the first forwarding path is faulty. In this case, when forwarding the first packet, the first network device may set the source routing validity identifier in the first packet to indicate that the source routing encapsulated in the first packet is invalid, and then forward the first packet obtained through setting the source routing validity identifier. In this way, the source routing validity identifier carried in the first packet received by a subsequent network device indicates that the source routing encapsulated in the first packet is invalid, and the subsequent network device may determine, based on the source routing validity identifier, that the first packet received by the subsequent network device satisfies the forwarding table forwarding condition. For example, the value of the source routing validity identifier carried in the first packet received by the first network device is "1", indicating that the source routing encapsulated in the first packet is valid. If the first network device determines that the egress port indicated by the port identifier of the first network device in the first source routing information carried in the first packet is in a non-working state, the first network device modifies the value of the source routing validity identifier carried in the first packet from "1" to "0". That the value of the source routing validity identifier is "0" indicates that the source routing encapsulated in the first packet is invalid. In this way, after receiving the first packet, the subsequent network device determines, based on the value "0" of the source routing validity identifier carried in the first packet, that the first packet satisfies the forwarding table forwarding condition. It may be easily understood that if the source routing validity identifier carried in the first packet received by the first network device indicates that the source routing encapsulated in the first packet is invalid, the first packet received by the first network device is usually forwarded by another network device on the first forwarding path, and the first network device is not the ingress device of the first forwarding path.

Optionally, before forwarding the first packet based on the destination identifier carried in the first packet, the first network device may obtain the forwarding table of the first network device. In this embodiment of this application, the forwarding table may be constructed by the first network device, or may be constructed by the control device and sent to the first network device. Therefore, that the first network device obtains the path table may include that the first network device constructs the forwarding table based on the network topology of the packet transmission system (for example, the packet transmission system shown in FIG. 1), or the first network device receives the forwarding table from the control device (for example, the control device 000 in FIG. 1). This is not limited in this embodiment of this application.

It should be noted that after receiving the first packet, the first network device first parses the first packet, to extract content such as the first source routing information, the destination identifier, the source routing validity identifier, and the source routing type from the first packet, and then performs determining and forwarding actions. For example, the first network device determines, based on the extracted information, whether the first packet satisfies the source routing forwarding condition. If the first packet does not satisfy the source routing forwarding condition, the first network device determines the forwarding table forwarding condition that the first packet satisfies. In addition, in the descriptions of a port status in this embodiment of this application, the working state is an UP state, and the non-working state is a DOWN state. However, the working state and the non-working state in this embodiment of this application are merely examples. In some implementation scenarios, the UP state may also be referred to as an active state and the DOWN state may also be referred to as an inactive state, or the UP state may also be referred to as a normal state and the DOWN state may also be referred to as an abnormal state or a faulty state. This is not limited in this embodiment of this application.

In conclusion, according to the packet transmission method provided in this embodiment of this application, the packet sent by the source end device may carry the source routing information and the destination identifier. The source routing information includes the port identifier of each network device on the forwarding path, and the destination identifier indicates the destination end device. After receiving the packet, the network device on the forwarding path forwards the packet based on the source routing information or the destination identifier, and preferentially forwards the packet based on the source routing information. Therefore, if the forwarding path is not faulty, the network device on the forwarding path may forward the packet based on the source routing information. This helps shorten a transmission delay of the packet from the source end device to the destination end device. If the forwarding path is faulty because the egress port indicated by the port identifier in the source routing information is in a non-working state, the network device on the forwarding path may forward the packet based on the destination identifier. This helps avoid a packet loss caused because the forwarding path is faulty. According to the technical solutions provided in this application, a packet loss rate can be reduced and a transmission delay of a packet can be shortened, to help improve flexibility and reliability of packet transmission. The technical solutions provided in this application are applicable to a service that has a high requirement on transmission performance, for example, a service such as artificial intelligence, real-time big data analysis, deep learning, distributed computing, distributed storage, and separation of computing and storage.

It may be easily understood according to the embodiment shown in FIG. 2 that, in this embodiment of this application, the first network device processes the first packet in different manners based on different forwarding conditions that the first packet satisfies. The following describes the packet transmission method in this application in three embodiments based on the different forwarding conditions that the first packet satisfies. In the following embodiment, for ease of description, a forwarding condition that "the source routing validity identifier carried in the first packet indicates that the source routing encapsulated in the first packet is valid, but the egress port indicated by the port identifier of the first network device in the first source routing information carried in the first packet is in a non-working state" is referred to as a first forwarding table forwarding condition, and a forwarding condition that "the source routing validity identifier carried in the first packet indicates that the source routing encapsulated in the first packet is invalid" is referred to as a second forwarding table forwarding condition.

Figure 3:
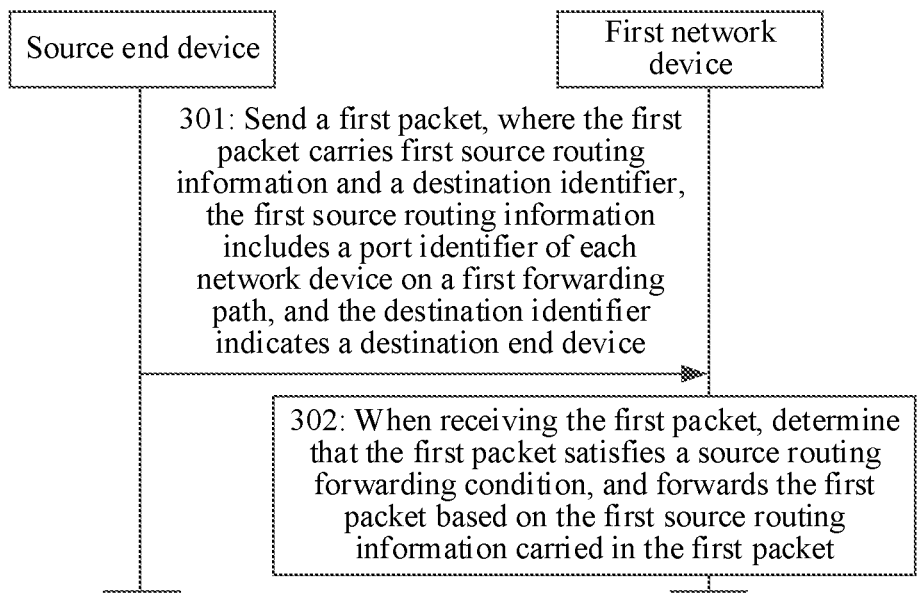
FIG. 3 is a flowchart of another packet transmission method according to an embodiment of this application.

For example, FIG. 3 is a flowchart of another packet transmission method according to an embodiment of this application. This embodiment is described by using an example in which a first packet satisfies a source routing forwarding condition. Referring to FIG. 3, the method may include the following steps.

Step 301: A source end device sends the first packet, where the first packet carries first source routing information and a destination identifier, the first source routing information includes a port identifier of each network device on a first forwarding path, and the destination identifier indicates a destination end device.

For an implementation process of step 301, refer to the foregoing step 201. Details are not described herein again in this embodiment of this application.

Step 302: When receiving the first packet, a first network device on the first forwarding path determines that the first packet satisfies the source routing forwarding condition, and forwards the first packet based on the first source routing information carried in the first packet.

After receiving the first packet, the first network device may determine, based on a source routing validity identifier carried in the first packet, whether source routing encapsulated in the first packet is valid. If the source routing encapsulated in the first packet is valid, the first network device determines an egress port of the first packet from ports of the first network device based on a port identifier of the first network device in the first source routing information carried in the first packet, and detects whether the egress port of the first packet is in a working state. If the egress port of the first packet is in a working state, the first network device determines that the first packet satisfies the source routing forwarding condition, and the first network device forwards the first packet through the egress port of the first packet.

Figure 4:
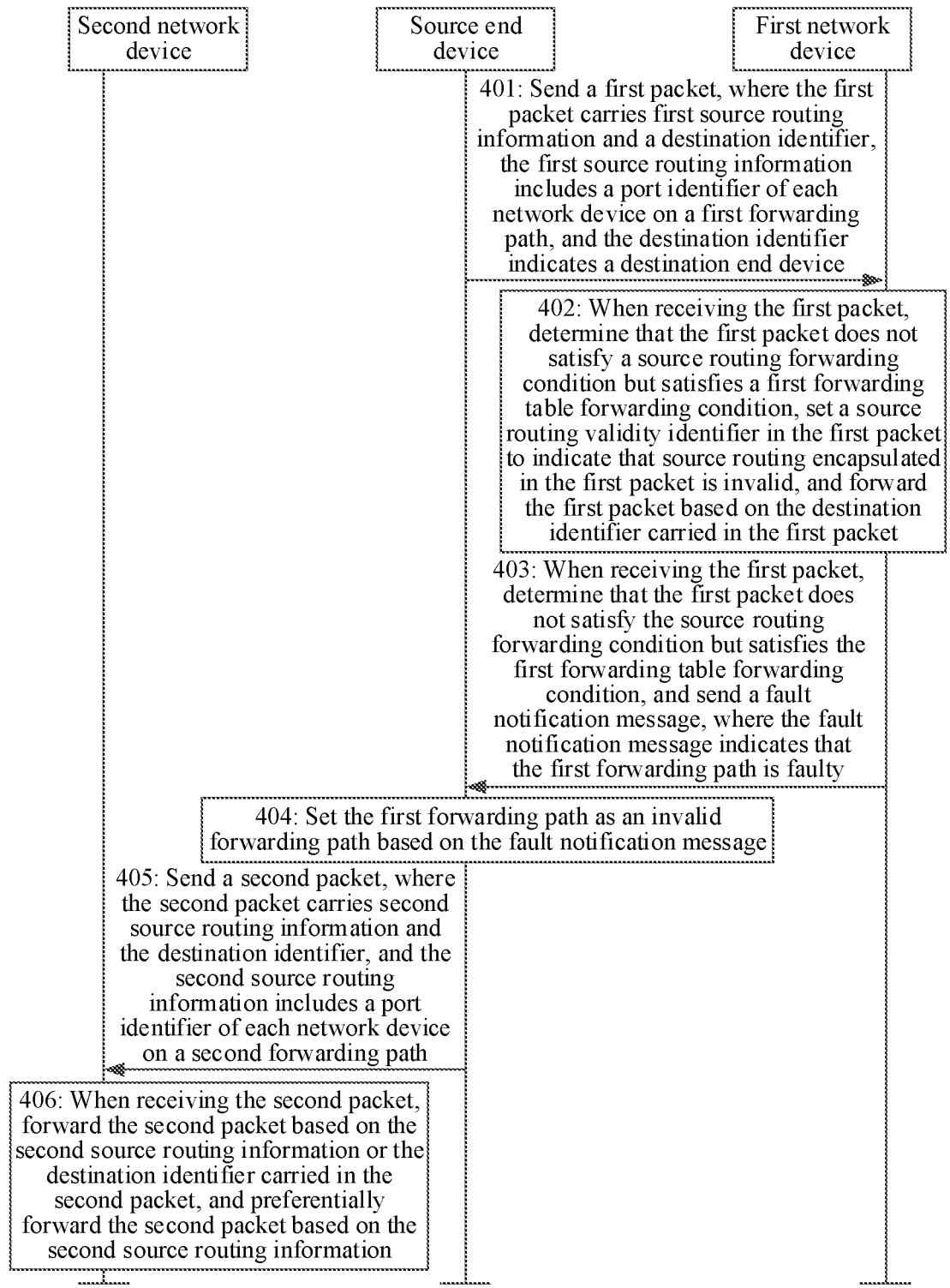
FIG. 4 is a flowchart of still another packet transmission method according to an embodiment of this application.

For example, FIG. 4 is a flowchart of still another packet transmission method according to an embodiment of this application. This embodiment is described by using an example in which a first packet does not satisfy a source routing forwarding condition but satisfies a first forwarding table forwarding condition. Referring to FIG. 4, the method may include the following steps.

Step 401: A source end device sends the first packet, where the first packet carries first source routing information and a destination identifier, the first source routing information includes a port identifier of each network device on a first forwarding path, and the destination identifier indicates a destination end device.

For an implementation process of step 401, refer to the foregoing step 201. Details are not described herein again in this embodiment of this application.

Step 402: When receiving the first packet, a first network device on the first forwarding path determines that the first packet does not satisfy the source routing forwarding condition but satisfies the first forwarding table forwarding condition, sets a source routing validity identifier in the first packet to indicate that source routing encapsulated in the first packet is invalid, and forwards the first packet based on the destination identifier carried in the first packet.

After receiving the first packet, the first network device may determine, based on the source routing validity identifier carried in the first packet, whether the source routing encapsulated in the first packet is valid. If the source routing encapsulated in the first packet is valid, the first network device determines an egress port of the first packet from ports of the first network device based on a port identifier of the first network device in the first source routing information carried in the first packet, and detects whether the egress port of the first packet is in a working state. If the egress port of the first packet is in a non-working state, the first network device determines that the first packet does not satisfy the source routing forwarding condition but satisfies the first forwarding table forwarding condition. The first network device sets the source routing validity identifier in the first packet to indicate that the source routing encapsulated in the first packet is invalid, looks up a forwarding table of the first network device based on the destination identifier carried in the first packet, to determine the egress port of the first packet from the ports of the first network device, and forwards the first packet through the egress port of the first network device. That is, the first network device forwards, through the egress port of the first packet, the first packet obtained through setting the source routing validity identifier. In other words, the source routing validity identifier in the first packet sent by the first network device indicates that the source routing encapsulated in the first packet is invalid.

Step 403: When receiving the first packet, the first network device on the first forwarding path determines that the first packet does not satisfy the source routing forwarding condition but satisfies the first forwarding table forwarding condition, and sends a fault notification message to the source end device, where the fault notification message indicates that the first forwarding path is faulty.

After the first network device receives the first packet, if the first packet does not satisfy the source routing forwarding condition but satisfies the first forwarding table forwarding condition, the first network device determines that the first forwarding path is faulty, and the first network device may generate the fault notification message, and send the fault notification message to the source end device, where the fault notification message indicates that the first forwarding path is faulty. For example, the fault notification message carries state indication information of the first forwarding path, and the state indication information indicates that the first forwarding path is faulty, or the fault notification message carries a source routing port state of the first network device. The source routing port state indicates that a source routing port (where the source routing port refers to the port indicated by the port identifier of the first network device in the first source routing information) of the first network device is faulty, to indicate that the first forwarding path on which the source routing port is located is faulty.

Optionally, the first network device may send the fault notification message to the source end device through a reverse path of the first forwarding path (for example, the fault notification message is returned to the source end device along an original path, and the fault notification message is forwarded to the source end device by using a network device located between the first network device and the source end device on the first forwarding path). Alternatively, for example, a control device may send the fault notification message to the source end device (for example, the first network device sends the fault notification message to the control device, and the control device forwards the fault notification message to the source end device). This is not limited in this embodiment of this application.

It should be noted that an execution sequence of step 402 and step 403 is not limited in this embodiment of this application. The first network device may first perform step 402 and then perform step 403, or may first perform step 403 and then perform step 402, or the first network device may synchronously perform step 402 and step 403. This is not limited in this embodiment of this application.

Step 404: The source end device sets the first forwarding path as an invalid forwarding path based on the fault notification message.

After receiving the fault notification message for indicating that the first forwarding path is faulty, the source end device determines, based on the fault notification message, that the first forwarding path is faulty, and may set the first forwarding path as the invalid forwarding path. Subsequently, when sending a packet to the destination end device, the source end device may select a forwarding path other than the first forwarding path in a path table of the source end device for the packet, to avoid that the source end device selects a faulty forwarding path for the packet.

Optionally, after receiving the fault notification message, the source end device parses the fault notification message to determine content of the fault notification message, determines, based on the content of the fault notification message, that the first forwarding path is faulty, and then sets a path entry corresponding to the first forwarding path in the path table of the source end device to an invalid entry, to set the first forwarding path as the invalid forwarding path. For example, the source end device adds an invalid mark to the path entry corresponding to the first forwarding path. The invalid mark is, for example, a mark such as "invalid", "00", or "WX", and indicates that the path entry is invalid, to indicate that the first forwarding path is invalid.

Step 405: The source end device sends a second packet, where the second packet carries second source routing information and the destination identifier, and the second source routing information includes a port identifier of each network device on a second forwarding path.

After receiving the fault notification message, the source end device determines that the first forwarding path is faulty. The source end device may determine the second forwarding path between the source end device and the destination end device, and send the packet to a destination end device through the second forwarding path. The second forwarding path and the first forwarding path are two different forwarding paths between the source end device and the destination end device. Optionally, the source end device sends the second packet, where the second packet carries the second source routing information and the destination identifier, the second source routing information includes the port identifier of each network device on the second forwarding path, and the destination identifier indicates the destination end device. For an implementation process in which the source end device sends the second packet, refer to the foregoing step 201. Details are not described again in this embodiment of this application.

It should be noted that an execution sequence of step 404 and step 405 is not limited in this embodiment of this application. The source end device may first perform step 404 and then perform step 405, or may first perform step 405 and then perform step 404, or the first network device may synchronously perform step 404 and step 405. This is not limited in this embodiment of this application.

Step 406: When receiving the second packet, the second network device on the second forwarding path forwards the second packet based on the second source routing information or the destination identifier carried in the second packet, and preferentially forwards the second packet based on the second source routing information.

For an implementation process of step 406, refer to the foregoing step 202. Details are not described herein again in this embodiment of this application.

Figure 5:
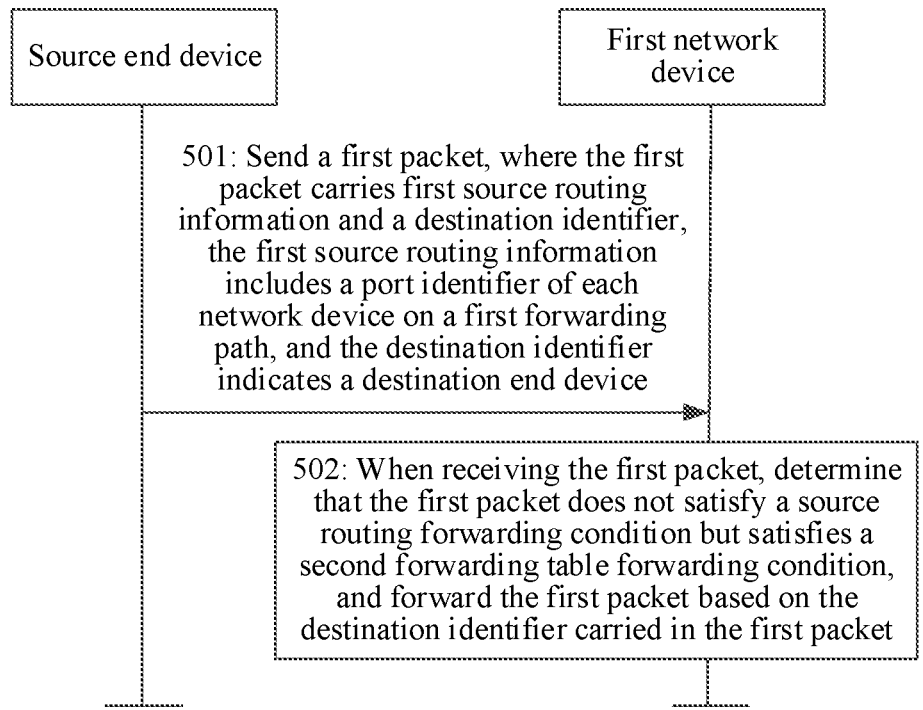
FIG. 5 is a flowchart of even another packet transmission method according to an embodiment of this application.

For example, FIG. 5 is a flowchart of even another packet transmission method according to an embodiment of this application. This embodiment is described by using an example in which a first packet does not satisfy a source routing forwarding condition but satisfies a second forwarding table forwarding condition. Referring to FIG. 5, the method may include the following steps.

Step 501: A source end device sends the first packet, where the first packet carries first source routing information and a destination identifier, the first source routing information includes a port identifier of each network device on a first forwarding path, and the destination identifier indicates a destination end device.

For an implementation process of step 501, refer to the foregoing step 201. Details are not described herein again in this embodiment of this application.

Step 502: When receiving the first packet, a first network device on the first forwarding path determines that the first packet does not satisfy the source routing forwarding condition but satisfies the second forwarding table forwarding condition, and forwards the first packet based on the destination identifier carried in the first packet.

After receiving the first packet, the first network device may determine, based on a source routing validity identifier carried in the first packet, whether source routing encapsulated in the first packet is valid. If the source routing encapsulated in the first packet is invalid, the first network device determines that the first packet does not satisfy the source routing forwarding condition but satisfies the second forwarding table forwarding condition. The first network device looks up a forwarding table of the first network device based on the destination identifier carried in the first packet, to determine an egress port of the first packet from ports of the first network device, and forward the first packet through the egress port of the first packet. With reference to the foregoing embodiment in FIG. 4, the first packet received by the first network device in the embodiment shown in FIG. 5 is forwarded by another network device on the first forwarding path, and the first network device may not be an ingress device of the first forwarding path.

Optionally, the first packet in the embodiments shown in FIG. 2 to FIG. 5 may be a source routing packet (the second packet in the embodiment shown in FIG. 4 may also be a source routing packet), and the source end device may send the first packet when satisfying a source routing encapsulation condition. The source routing encapsulation condition may include that both the source end device and the destination end device support a source routing encapsulation function, and network devices on the first forwarding path support a source routing forwarding function. Optionally, if the source end device determines not to satisfy the source routing encapsulation condition, the source end device may send an Ethernet packet. In an optional embodiment, the packet transmission method provided in this application may further be implemented by using an implementation solution of the embodiment shown in FIG. 6.

Figure 6:
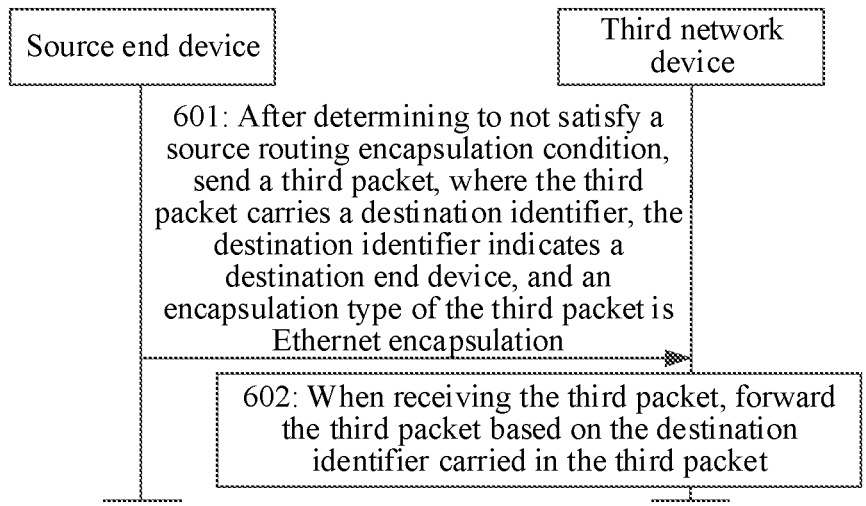
FIG. 6 is a flowchart of even another packet transmission method according to an embodiment of this application.

For example, FIG. 6 is a flowchart of even another packet transmission method according to an embodiment of this application. Referring to FIG. 6. The method may include the following steps.

Step 601: After determining not to satisfy a source routing encapsulation condition, a source end device sends a third packet, where the third packet carries a destination identifier, the destination identifier indicates a destination end device, and an encapsulation type of the third packet is Ethernet encapsulation.

Optionally, after determining not to satisfy the source routing encapsulation condition, the source end device may generate the third packet based on the destination end device, so that the third packet carries the destination identifier for indicating the destination end device, and then send the third packet. The destination identifier may be a device identifier of the destination end device, an IP address of the destination end device, a LID of the destination end device, or another identifier for indicating the destination end device. This is not limited in this embodiment of this application.

The encapsulation type of the third packet is the Ethernet encapsulation, and the third packet may be referred to as an Ethernet packet. Optionally, the third packet may further carry an Ethernet type, and the Ethernet type indicates that the encapsulation type of the third packet is the Ethernet encapsulation, so that a network device that receives the third packet determines, based on the Ethernet type, that the encapsulation type of the third packet is the Ethernet encapsulation. It may be easily understood that the third packet may further carry a packet payload. In this embodiment of this application, both the destination identifier and the Ethernet type may be carried in a header of the third packet.

Step 602: When receiving the third packet, a third network device forwards the third packet based on the destination identifier carried in the third packet.

The third network device may be any network device that can receive the third packet in a packet transmission system. The third network device may be a network device that provides an access service for the source end device, or may be a network device that provides an access service for the destination end device, or another network device in the packet transmission system. This is not limited in this embodiment of this application.

After receiving the third packet, the third network device determines, based on the Ethernet type carried in the third packet, that the encapsulation type of the third packet is the Ethernet encapsulation (that is, the third network device determines that the third packet is the Ethernet packet), and then looks up a forwarding table of the third network device based on the destination identifier carried in the third packet, to determine an egress port of the third packet from ports of the third network device, and forward the third packet through the egress port of the third packet. Each network device that receives the third packet in the packet transmission system forwards the third packet according to the implementation of step 603 until the third packet arrives at the destination end device.

It should be noted that the packet transmission method provided in the embodiment shown in FIG. 6 is a common forwarding table forwarding method. In this embodiment of this application, the source end device has a determining capability, and the source end device may determine whether to satisfy the source routing encapsulation condition. When satisfying the source routing encapsulation condition, the source end device may send a packet according to the method provided in the embodiments shown in FIG. 3 to FIG. 5. When not satisfying the source routing encapsulation condition, the source end device may send a packet according to the method provided in the embodiment shown in FIG. 6. The source end device may be a dual-mode forwarding device, and supports both source routing forwarding and forwarding table forwarding, so that the source end device may determine whether to satisfy the source routing encapsulation condition, and determine whether to send a source routing packet or an Ethernet packet. The technical solutions provided in embodiments of this application do not require that all network devices in a communication network support a same forwarding function. In the communication network, some network devices may support dual-mode forwarding, and some network devices may support single-mode forwarding. The communication network may be hybrid networking of a dual-mode forwarding device and a single-mode forwarding device. The technical solutions provided in embodiments of this application can be effectively compatible with a conventional forwarding table forwarding manner.

It may be easily understood according to the foregoing embodiments that, in embodiments of this application, encapsulation types of packets sent by a source end device are different, and manners in which a network device forwards the packets are different based on whether a source routing encapsulation condition is satisfied. The manners in which the network device forwards the packets are different based on whether a source routing forwarding path (namely, a forwarding path indicated by source routing information carried in the packet sent by the source end device) is faulty. For ease of understanding, the following describes the packet transmission method provided in this application with reference to examples in this application.

Figure 7:
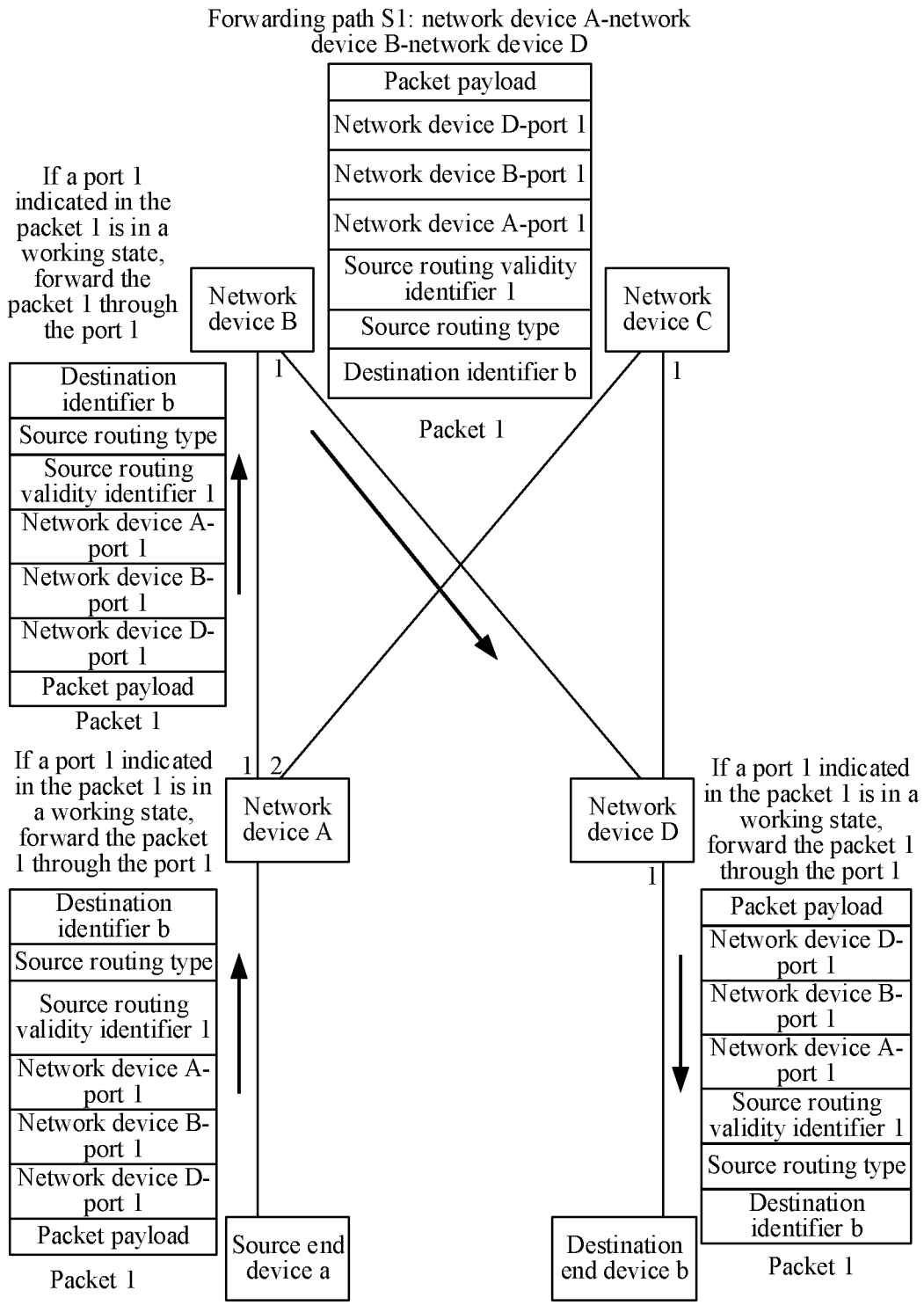
FIG. 7 is a schematic diagram of a packet transmission method according to an embodiment of this application.

For example, FIG. 7 is a schematic diagram of a packet transmission method according to an embodiment of this application. FIG. 7 is described by using an example in which a source routing encapsulation condition is satisfied and a source routing forwarding path is not faulty (that is, an egress port indicated by a port identifier in source routing information is in a working state). As shown in FIG. 7, a forwarding path S1 is a first forwarding path (namely, the source routing forwarding path) from a source end device a to a destination end device b. Both the source end device a and the destination end device b support a source routing encapsulation function, and a network device A, a network device B, and a network device D support a source routing forwarding function. Therefore, the source end device a determines to satisfy the source routing encapsulation condition. The source end device a sends a packet 1 (for example, a first packet) to the destination end device b through the forwarding path S1. The packet 1 carries first source routing information (namely, network device A-port 1, network device B-port 1, and network device D-port 1), a destination identifier b, a source routing validity identifier 1, a source routing type, and a packet payload. The destination identifier b indicates the destination end device b, the source routing validity identifier 1 indicates that source routing encapsulated in the packet 1 is valid, and the source routing type indicates that an encapsulation type of the packet 1 is source routing encapsulation.

The packet 1 sent by the source end device a first arrives at the network device A. The network device A determines, based on the source routing type carried in the packet 1, that the encapsulation type of the packet 1 is the source routing encapsulation, determines, based on the source routing validity identifier 1 carried in the packet 1, that the source routing encapsulated in the packet 1 is valid, and determines, based on a port identifier (namely, the network device A-port 1) of the network device A in the first source routing information carried in the packet 1, that an egress port of the packet 1 is a port 1 and that the port 1 is in a working state (namely, an UP state). Therefore, the network device A determines that the packet 1 satisfies a source routing forwarding condition, and the network device A forwards the packet 1 through a port 1. The packet 1 forwarded by the network device A through the port 1 arrives at the network device B. The network device B determines, in a same processing manner as that of the network device A, that the received packet 1 satisfies the source routing forwarding condition, and forwards the packet 1 through a port 1 of the network device B. By analogy, the network device D forwards the packet 1 through a port 1 of the network device D in a same processing manner as that of the network device A. Finally, the packet 1 is forwarded from the source end device a to the destination end device b in a source routing forwarding manner by using the network devices on the forwarding path S1. Because the packet 1 is forwarded from the source end device a to the destination end device b in the source routing forwarding manner, a transmission delay of the packet 1 from the source end device a to the destination end device b is short.

Figure 8:
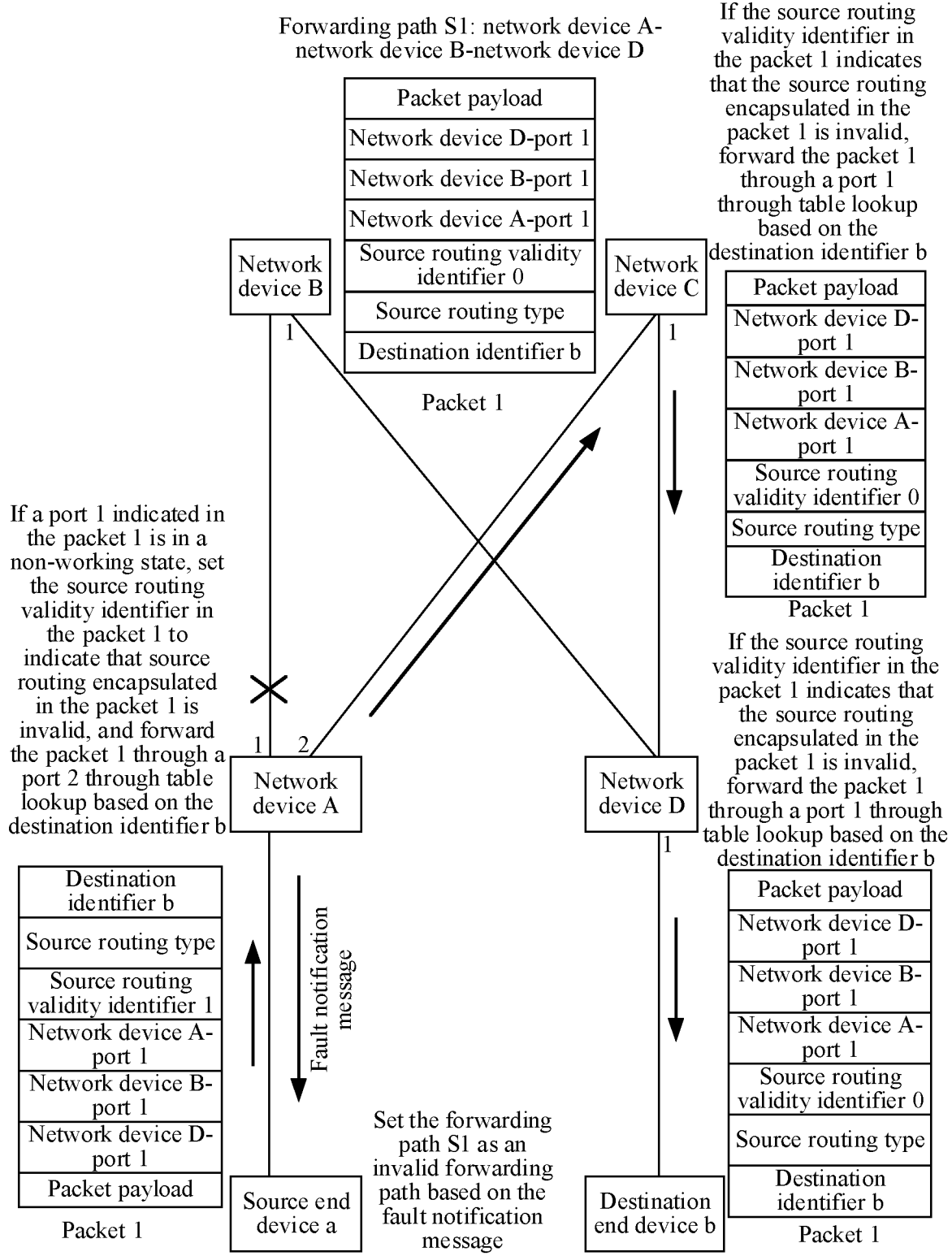
FIG. 8 is a schematic diagram of another packet transmission method according to an embodiment of this application.

For example, FIG. 8 is a schematic diagram of another packet transmission method according to an embodiment of this application. FIG. 8 is described by using an example in which a source routing encapsulation condition is satisfied but a source routing forwarding path is faulty (that is, an egress port indicated by at least one port identifier in source routing information is in a non-working state). As shown in FIG. 8, a forwarding path S1 is a first forwarding path (namely, the source routing forwarding path) from a source end device a to a destination end device b. Both a source end device a and a destination end device b support a source routing encapsulation function, and a network device A, a network device B, and a network device D support a source routing forwarding function. Therefore, the source end device a determines to satisfy the source routing encapsulation condition. The source end device a sends a packet 1 (for example, a first packet) to the destination end device b through the forwarding path S1. The packet 1 carries first source routing information (namely, network device A-port 1, network device B-port 1, and network device D-port 1), a destination identifier b, a source routing validity identifier 1, a source routing type, and a packet payload. The destination identifier b indicates the destination end device b, the source routing validity identifier 1 indicates that source routing encapsulated in the packet 1 is valid, and the source routing type indicates that an encapsulation type of the packet 1 is source routing encapsulation.

The packet 1 sent by the source end device a first arrives at the network device A. The network device A determines, based on the source routing type carried in the packet 1, that the encapsulation type of the packet 1 is the source routing encapsulation, determines, based on the source routing validity identifier 1 carried in the packet 1, that the source routing encapsulated in the packet 1 is valid, and determines, based on a port identifier (namely, the network device A-port 1) of the network device A in the first source routing information carried in the packet 1, that an egress port of the packet 1 is a port 1. However, a port 1 of the network device A is in a non-working state (namely, a DOWN state). Therefore, the network device A determines that the packet 1 does not satisfy a source routing forwarding condition but satisfies a first forwarding table forwarding condition. The network device A modifies the source routing validity identifier 1 in the packet 1 to a source routing validity identifier 0, where the source routing validity identifier 0 indicates that the source routing encapsulated in the packet 1 is invalid (that is, the network device A sets the source routing validity identifier in the packet 1 to indicate that the source routing encapsulated in the packet 1 is invalid). Then, the network device A looks up a forwarding table of the network device A based on the destination identifier b carried in the packet 1, and determines that the egress port of the packet 1 is a port 2, and the network device A forwards the modified packet 1 through a port 2 of the network device A. The packet 1 forwarded by the network device A through the port 2 of the network device A arrives at a network device C. The network device C determines, based on the source routing type carried in the packet 1, that the encapsulation type of the packet 1 is the source routing encapsulation, but determines, based on the source routing validity identifier 0 carried in the packet 1, that the source routing encapsulated in the packet 1 is invalid. Therefore, the network device C determines that the packet 1 does not satisfy the source routing forwarding condition but satisfies a second forwarding table forwarding condition. The network device C looks up a forwarding table of the network device C based on the destination identifier b carried in the packet 1, determines that the egress port of the packet 1 is a port 1, and forwards the packet 1 through a port 1 of the network device C. The packet 1 forwarded by the network device C through the port 1 of the network device C arrives at the network device D. The network device D determines, in a same processing manner as that of the network device C, that the packet 1 does not satisfy the source routing forwarding condition but satisfies the second forwarding table forwarding condition. The network device D looks up a forwarding table of the network device D based on the destination identifier b carried in the packet 1, determines that the egress port of the packet 1 is a port 1, and forwards the packet 1 through a port 1 of the network device D. Finally, the packet 1 is forwarded from the source end device a to the destination end device b in a forwarding table forwarding manner by using the network device A, the network device C, and the network device D. When determining that the port 1 (namely, a source routing port) of the network device A is in a non-working state, the network device A forwards the packet 1 based on the destination identifier b carried in the packet 1, instead of discarding the packet 1. Therefore, a packet 1 loss caused because the forwarding path S1 is faulty can be avoided, and flexibility and reliability of packet transmission can be ensured.

In the embodiment shown in FIG. 8, after determining that the port 1 of the network device A is in a non-working state, the network device A may send a fault notification message to the source end device a to notify the source end device a that the forwarding path S1 (namely, the source routing forwarding path) is faulty. After receiving the fault notification message, the source end device a sets the forwarding path S1 as an invalid forwarding path based on the fault notification message. In this way, subsequently, the source end device a may select a forwarding path other than the forwarding path S1 to send a packet to the destination end device b. This avoids that the source end device a selects a faulty forwarding path to send the packet to the destination end device b, and ensures reliability of packet transmission.

Figure 9:
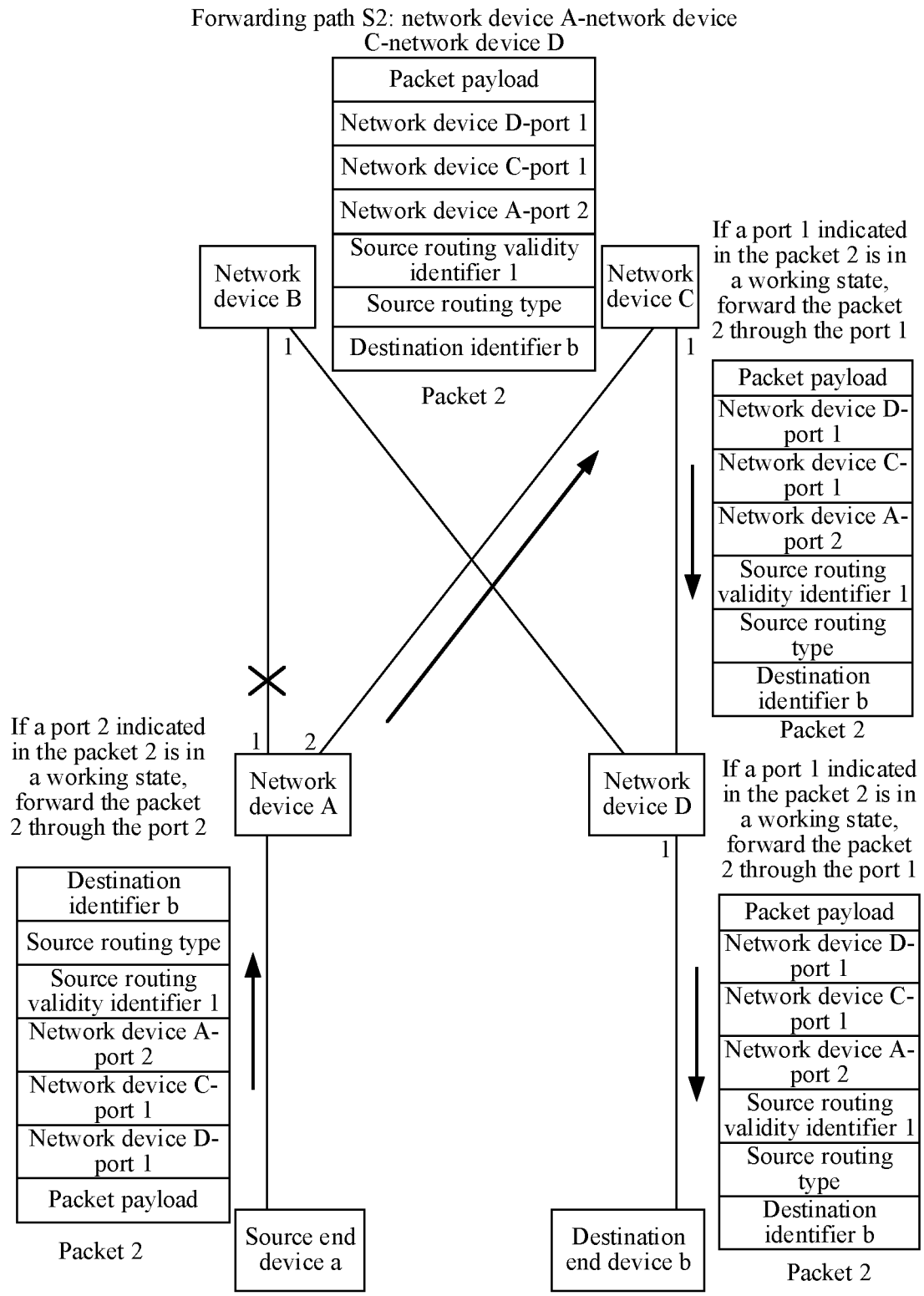
FIG. 9 is a schematic diagram of still another packet transmission method according to an embodiment of this application.

For example, FIG. 9 is a schematic diagram of still another packet transmission method according to an embodiment of this application. FIG. 9 shows a case in which a source end device a sends a packet to a destination end device b through a forwarding path S2 after receiving a fault notification message for indicating that a forwarding path S1 is faulty. As shown in FIG. 9, the forwarding path S2 is a second forwarding path (namely, a source routing forwarding path) from the source end device a to the destination end device b. Both the source end device a and the destination end device b support a source routing encapsulation function, and a network device A, a network device C, and a network device D support a source routing forwarding function. Therefore, the source end device a determines to satisfy a source routing encapsulation condition. The source end device a sends a packet 2 to the destination end device b through the forwarding path S2, where the packet 2 carries second source routing information (namely, network device A-port 2, network device C-port 1, and network device D-port 1), a destination identifier b, a source routing validity identifier 1, a source routing type, and a packet payload. The destination identifier b indicates the destination end device b, and the source routing validity identifier 1 indicates that source routing encapsulated in the packet 2 is valid, the source routing type indicates that an encapsulation type of the packet 2 is source routing encapsulation. The packet 2 is forwarded from the source end device a to the destination end device b in a source routing forwarding manner by using the network device A, the network device C, and the network device D. For an implementation process in which the network device A, the network device C, and the network device D forward the packet 2 in the source routing forwarding manner, refer to the embodiment shown in FIG. 7. Details are not described herein again in this embodiment.

Figure 10:
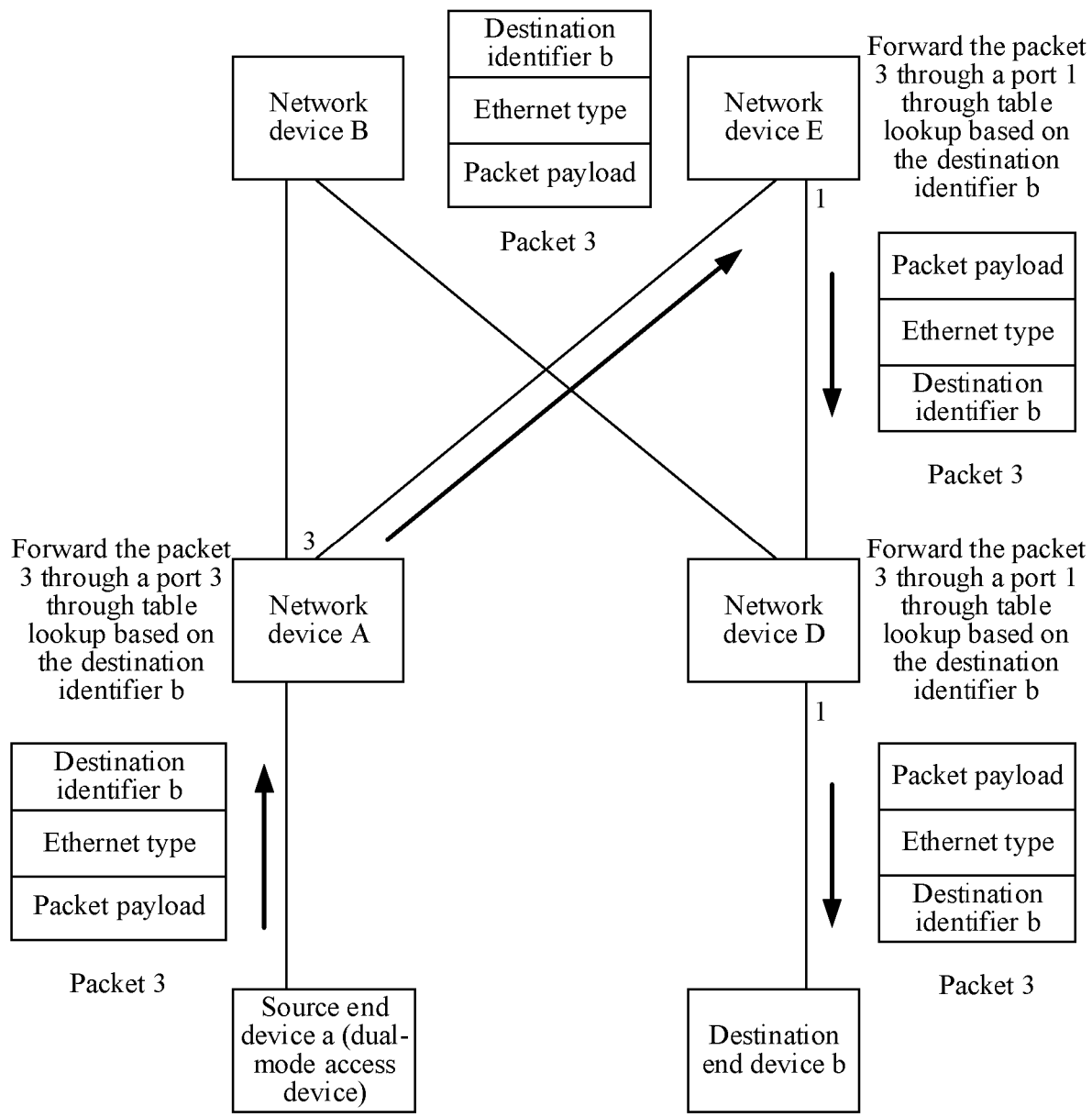
FIG. 10 is a schematic diagram of even another packet transmission method according to an embodiment of this application.

For example, FIG. 10 is a schematic diagram of even another packet transmission method according to an embodiment of this application. FIG. 10 is described by using an example in which a source routing encapsulation condition is not satisfied. As shown in FIG. 10, a source end device a may be a dual-mode access device. The source end device a supports both a source routing encapsulation function and an Ethernet encapsulation function, and a destination end device b does not support the source routing encapsulation function. The source end device a determines not to satisfy the source routing encapsulation condition. The source end device a sends a packet 3 (for example, a third packet) to the destination end device b, where the packet 3 carries a destination identifier b, an Ethernet type, and a packet payload, and the destination identifier b indicates the destination end device b, the Ethernet type indicates that an encapsulation type of the packet 3 is Ethernet encapsulation.

The packet 3 sent by the source end device a first arrives at a network device A. The network device A determines, based on the Ethernet type carried in the packet 3, that the encapsulation type of the packet 3 is the Ethernet encapsulation, looks up a forwarding table of the network device A based on the destination identifier b carried in the packet 3, and determines that an egress port of the packet 3 is a port 3. The network device A forwards the packet 3 through a port 3 of the network device A. The packet 3 forwarded by the network device A through the port 3 of the network device A arrives at a network device E. The network device E determines, in a same processing manner as that of the network device A, that the egress port of the packet 3 is a port 1, and the network device E forwards the packet 3 through a port 1 of the network device E. The packet 3 forwarded by the network device E through the port 1 of the network device E arrives at a network device D. The network device D determines, in a same processing manner as that of the network device A, that the egress port of the packet 3 is a port 1, and the network device D forwards the packet 3 through a port 1 of the network device D. Finally, the packet 3 is forwarded from the source end device a to the destination end device b in a forwarding table forwarding manner by using the network device A, the network device E, and the network device D. Because the source end device a sends an Ethernet packet when determining not to satisfy the source routing encapsulation condition, the packet transmission method provided in this application can be well compatible with a conventional packet transmission method.

The foregoing embodiments are described by using an example in which network devices on a source routing forwarding path (for example, a forwarding path S1 or a forwarding path S2) support a forwarding table forwarding function and a source routing forwarding function (that is, the network devices on the source routing forwarding path are dual-mode forwarding devices). In embodiments of this application, on the source routing forwarding path, some network devices (namely, single-mode forwarding devices) may support only the forwarding table forwarding function but not the source routing forwarding function. In an optional implementation, the packet transmission method provided in this application may be further implemented by using the following embodiment shown in FIG. 11.

Figure 11:
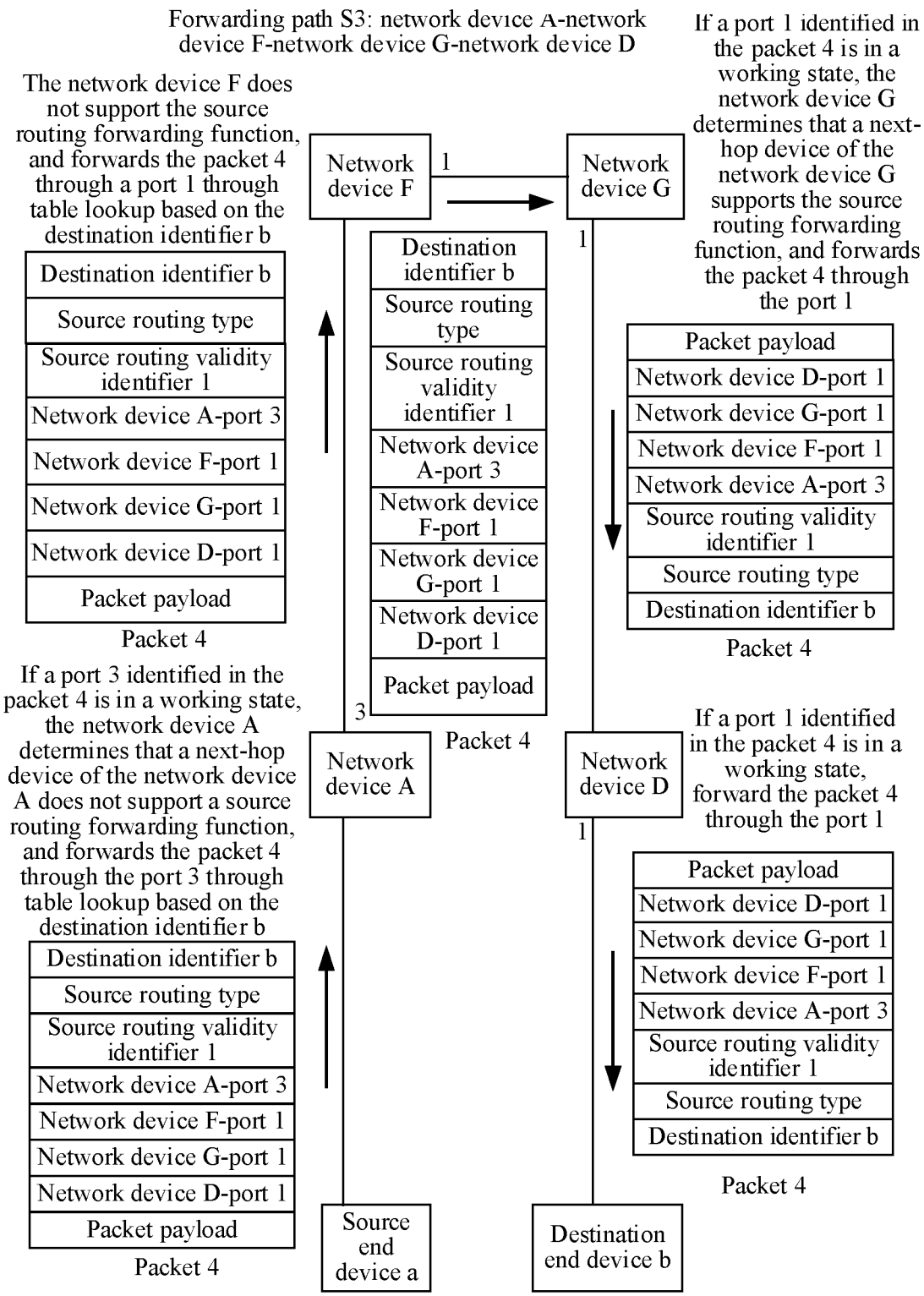
FIG. 11 is a schematic diagram of even another packet transmission method according to an embodiment of this application.

For example, FIG. 11 is a schematic diagram of even another packet transmission method according to an embodiment of this application. FIG. 11 is described by using an example in which a network device that does not support a source routing forwarding function exists on a source routing forwarding path. As shown in FIG. 11, a forwarding path S3 is a source routing forwarding path from a source end device a to a destination end device b. Both the source end device a and the destination end device b support a source routing encapsulation function. A network device A, a network device G, and a network device D support the source routing forwarding function. A network device F does not support the source routing forwarding function. The source end device a sends a packet 4 to the destination end device b through the forwarding path S3. The packet 4 carries source routing information (namely, network device A-port 3, network device F-port 1, network device G-port 1, and network device D-port 1), a destination identifier b, a source routing validity identifier 1, a source routing type, and a packet payload. The destination identifier b indicates the destination end device b, and the source routing validity identifier 1 indicates that source routing encapsulated in the packet 4 is valid, the source routing type indicates that an encapsulation type of the packet 4 is source routing encapsulation.

The packet 4 sent by the source end device a first arrives at the network device A. The network device A determines, based on the source routing type carried in the packet 4, that the encapsulation type of the packet 4 is the source routing encapsulation, determines, based on the source routing validity identifier 1 carried in the packet 4, that the source routing encapsulated in the packet 4 is valid, and determines, based on a port identifier (namely, the network device A-port 3) of the network device A in the source routing information carried in the packet 4, that an egress port of the packet 4 is a port 3 and that the port 3 is in a working state. However, the network device A determines that a next-hop device (namely, the network device F) does not support the source routing forwarding function. Therefore, the network device A looks up a forwarding table of the network device A based on the destination identifier b carried in the packet 4, and determines that the egress port of the packet 4 is the port 3. The network device A forwards the packet 4 through a port 3 of the network device A. The packet 4 forwarded by the network device A through the port 3 of the network device A arrives at the network device F. Because the network device F does not support the source routing forwarding function, the network device F looks up a forwarding table of the network device F based on the destination identifier b carried in the packet 4, and determines that the egress port of the packet 4 is a port 1. The network device F forwards the packet 4 through a port 1 of the network device F. The packet 4 forwarded by the network device F through the port 1 of the network device F arrives at the network device G. The network device G determines, based on the source routing type carried in the packet 4, that the encapsulation type of the packet 4 is the source routing encapsulation, determines, based on the source routing validity identifier 1 carried in the packet 4, that the source routing encapsulated in the packet 4 is valid, and determines, based on a port identifier (namely, the network device G-port 1) of the network device G in the source routing information carried in the packet 4, that the egress port of the packet 4 is a port 1 and the port 1 is in a working state. In addition, the network device G determines that a next-hop device (namely, the network device D) supports the source routing forwarding function. Therefore, the network device G forwards the packet 4 based on a port 1 indicated in the packet 4. Finally, the packet 4 is forwarded from the source end device a to the destination end device b by using the network device A, the network device F, the network device G, and the network device D.

The foregoing describes the packet transmission method in this application. The following describes apparatus embodiments of this application. The apparatus embodiments of this application may be used to perform the method embodiments of this application. For details not disclosed in the apparatus embodiments of this application, refer to the method embodiments of this application.

Figure 12:
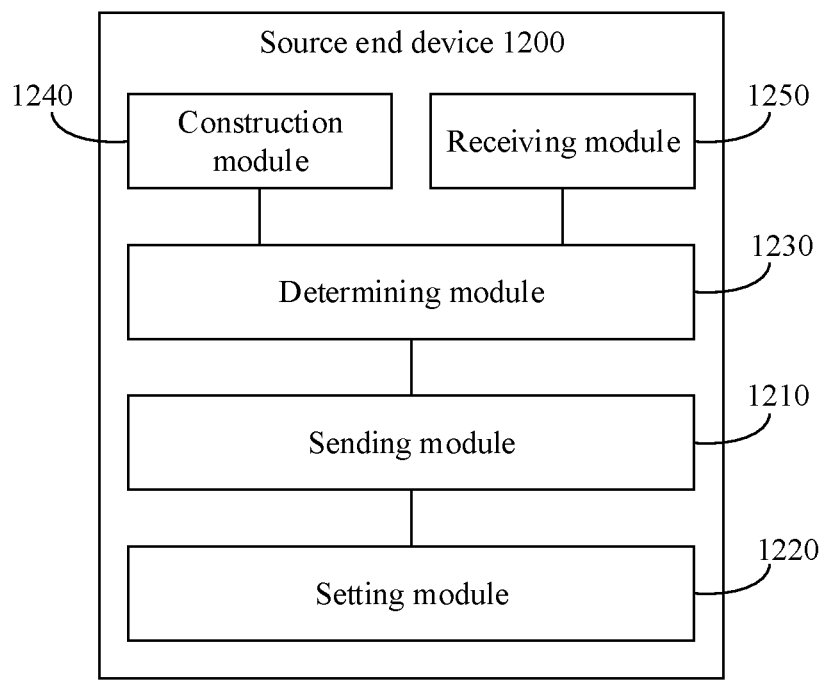
FIG. 12 is a schematic diagram of a logical structure of a source end device according to an embodiment of this application.

FIG. 12 is a schematic diagram of a logical structure of a source end device 1200 according to an embodiment of this application. The source end device 1200 may be a server. Referring to FIG. 12, the source end device 1200 may include but is not limited to a sending module 1210, configured to send a first packet, where the first packet carries first source routing information and a destination identifier. The first source routing information includes a port identifier of each network device on a first forwarding path, and the destination identifier indicates a destination end device, so that a first network device on the first forwarding path forwards the first packet based on the first source routing information or the destination identifier, and the first network device preferentially forwards the first packet based on the first source routing information. For implementation of a function of the sending module 1210, refer to related descriptions of step 201, step 301, step 401, and step 501.

Optionally, an encapsulation type of the first packet is source routing encapsulation, the first packet further carries a source routing validity identifier, and the source routing validity identifier indicates that source routing encapsulated in the first packet is valid or invalid.

Optionally, still referring to FIG. 12, the source end device 1200 further includes a setting module 1220, configured to, after the sending module 1210 sends the first packet, if a fault notification message indicating that the first forwarding path is faulty is received, set the first forwarding path as an invalid forwarding path. For implementation of a function of the setting module 1220, refer to related descriptions of step 404.

Optionally, the sending module 1210 is further configured to, after sending the first packet, if the fault notification message indicating that the first forwarding path is faulty is received, send a second packet. The second packet carries second source routing information and the destination identifier, and the second source routing information includes a port identifier of each network device on a second forwarding path, so that a second network device on the second forwarding path forwards the second packet based on the second source routing information or the destination identifier, and the second network device preferentially forwards the second packet based on the second source routing information. For implementation of a function of the sending module 1210, refer to related descriptions of step 405.

Optionally, the sending module 1210 is configured to, when a source routing encapsulation condition is satisfied, send the first packet. The source routing encapsulation condition includes that both the source end device and the destination end device support a source routing encapsulation function, and the network devices on the first forwarding path support a source routing forwarding function.

Optionally, the sending module 1210 is further configured to, when the source routing encapsulation condition is not satisfied, send a third packet, where the third packet carries the destination identifier, and an encapsulation type of the third packet is Ethernet encapsulation. For implementation of a function of the sending module 1210, refer to related descriptions of step 601.

Optionally, still referring to FIG. 12, the source end device 1200 further includes a determining module 1230, configured to, before the sending module 1210 sends the first packet, determine the first forwarding path based on a path table of the source end device. The path table includes at least one path entry related to the destination end device, and each of the at least one path entry indicates one forwarding path between the source end device and the destination end device.

Optionally, still referring to FIG. 12, the source end device 1200 further includes a construction module 1240, configured to, before the determining module 1230 determines the first forwarding path based on the path table of the source end device, construct the path table based on a network topology of a packet transmission system; or the receiving module 1250, configured to, before the determining module 1230 determines the first forwarding path based on the path table of the source end device, receive the path table from a control device.

In conclusion, in the technical solution in this embodiment of this application, the packet sent by the source end device may carry the source routing information and the destination identifier. The source routing information includes the port identifier of each network device on the forwarding path, and the destination identifier indicates the destination end device. After receiving the packet, the network device on the forwarding path forwards the packet based on the source routing information or the destination identifier, and preferentially forwards the packet based on the source routing information. Therefore, if the forwarding path is not faulty, the network device on the forwarding path may forward the packet based on the source routing information. This helps shorten a transmission delay of the packet from the source end device to the destination end device. If the forwarding path is faulty because an egress port indicated by the port identifier in the source routing information is in a non-working state, the network device on the forwarding path may forward the packet based on the destination identifier. This helps avoid a packet loss caused because the forwarding path is faulty. According to the technical solutions provided in this application, a packet loss rate can be reduced and a transmission delay of a packet can be shortened, to help improve flexibility and reliability of packet transmission.

Figure 13:
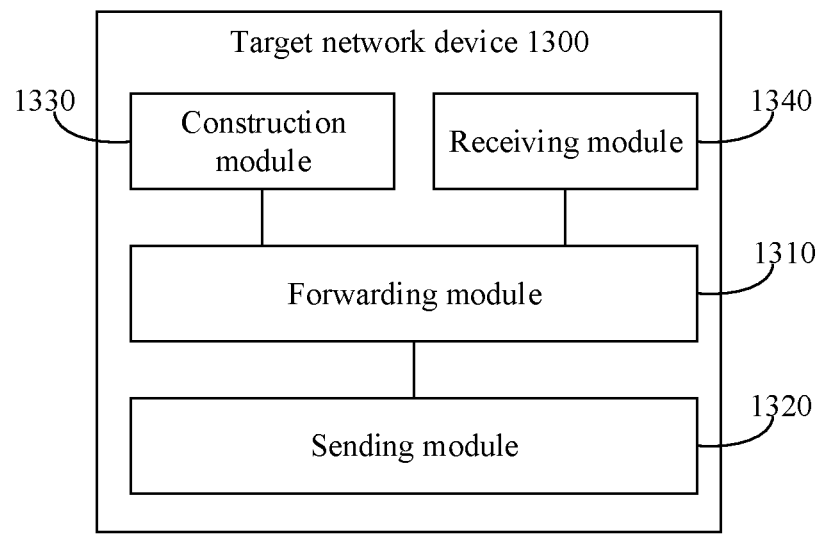
FIG. 13 is a schematic diagram of a logical structure of a target network device according to an embodiment of this application.

FIG. 13 is a schematic diagram of a logical structure of a target network device 1300 according to an embodiment of this application. The target network device 1300 may be a switch or a router, and the target network device 1300 may be the first network device, the second network device, or the third network device in the foregoing embodiments. Referring to FIG. 13, the target network device 1300 may include but is not limited to a forwarding module 1310, configured to, when a first packet carrying first source routing information and a destination identifier is received, forward the first packet based on the first source routing information or the destination identifier, and preferentially forward the first packet based on the first source routing information.

The first source routing information includes a port identifier of each network device on a first forwarding path, and the destination identifier indicates a destination end device. For implementation of a function of the forwarding module 1310, refer to related descriptions of step 202, step 302, step 402, and step 502.

Optionally, the forwarding module 1310 is configured to forward the first packet based on the first source routing information if the first packet satisfies a source routing forwarding condition; or forward the first packet based on the destination identifier if the first packet does not satisfy a source routing forwarding condition but satisfies a forwarding table forwarding condition.

Optionally, an encapsulation type of the first packet is source routing encapsulation, the first packet further carries a source routing validity identifier, and the source routing validity identifier indicates that source routing encapsulated in the first packet is valid or invalid.

Optionally, the source routing forwarding condition includes that the source routing validity identifier indicates that the source routing encapsulated in the first packet is valid, and an egress port indicated by a port identifier of the target network device in the first source routing information is in a working state.

Optionally, the forwarding table forwarding condition includes that the source routing validity identifier indicates that the source routing encapsulated in the first packet is invalid.

Optionally, the forwarding table forwarding condition includes that the source routing validity identifier indicates that the source routing encapsulated in the first packet is valid, but an egress port indicated by a port identifier of the target network device in the first source routing information is in a non-working state.

Optionally, the forwarding module 1310 is configured to, if the first packet does not satisfy the source routing forwarding condition but satisfies the forwarding table forwarding condition, set the source routing validity identifier to indicate that the source routing encapsulated in the first packet is invalid; and forward the first packet based on the destination identifier.

Optionally, still referring to FIG. 13, the target network device 1300 further includes a sending module 1320, configured to, if the first packet does not satisfy the source routing forwarding condition but satisfies the forwarding table forwarding condition, send a fault notification message to a source end device, where the fault notification message indicates that the first forwarding path is faulty. For implementation of a function of the sending module 1320, refer to related descriptions of step 403.

Optionally, the forwarding module 1310 is further configured to, when a second packet carrying second source routing information and the destination identifier is received, forward the second packet based on the second source routing information or the destination identifier, and preferentially forward the second packet based on the second source routing information. The second source routing information includes a port identifier of each network device on a second forwarding path. For implementation of a function of the forwarding module 1310, refer to related descriptions of step 406.

Optionally, still referring to FIG. 13, the target network device 1300 further includes a construction module 1330, configured to, before the forwarding module 1310 forwards the first packet based on the destination identifier, construct a forwarding table based on a network topology of a packet transmission system; or a receiving module 1340, configured to, before the forwarding module 1310 forwards the first packet based on the destination identifier, receive a forwarding table from a control device. The forwarding table includes at least one forwarding entry, and each of the at least one forwarding entry indicates a mapping relationship between one destination identifier and one port of the target network device.

Optionally, the forwarding module 1310 is further configured to, when a third packet carrying the destination identifier is received, forward the third packet based on the destination identifier, where an encapsulation type of the third packet is Ethernet encapsulation. For implementation of a function of the forwarding module 1310, refer to related descriptions of step 602.

In conclusion, in the technical solution in this embodiment of this application, the packet sent by the source end device may carry the source routing information and the destination identifier. The source routing information includes the port identifier of each network device on the forwarding path, and the destination identifier indicates the destination end device. After receiving the packet, the network device on the forwarding path forwards the packet based on the source routing information or the destination identifier, and preferentially forwards the packet based on the source routing information. Therefore, if the forwarding path is not faulty, the network device on the forwarding path may forward the packet based on the source routing information. This helps shorten a transmission delay of the packet from the source end device to the destination end device. If the forwarding path is faulty because the egress port indicated by the port identifier in the source routing information is in a non-working state, the network device on the forwarding path may forward the packet based on the destination identifier. This helps avoid a packet loss caused because the forwarding path is faulty. According to the technical solutions provided in this application, a packet loss rate can be reduced and a transmission delay of a packet can be shortened, to help improve flexibility and reliability of packet transmission.

It should be understood that the source end device and the target network device provided in embodiments of this application may be alternatively implemented by using an application-specific integrated circuit (ASIC) or a programmable logic device (PLD). The PLD may be a complex PLD (CPLD), a field-programmable gate array (FPGA), generic array logic (GAL), or any combination thereof. Alternatively, the packet transmission method provided in the foregoing method embodiments may be implemented by using software. When the packet transmission method provided in the foregoing method embodiments is implemented by using software, the modules in the source end device and the target network device may alternatively be software modules.

Figure 14:
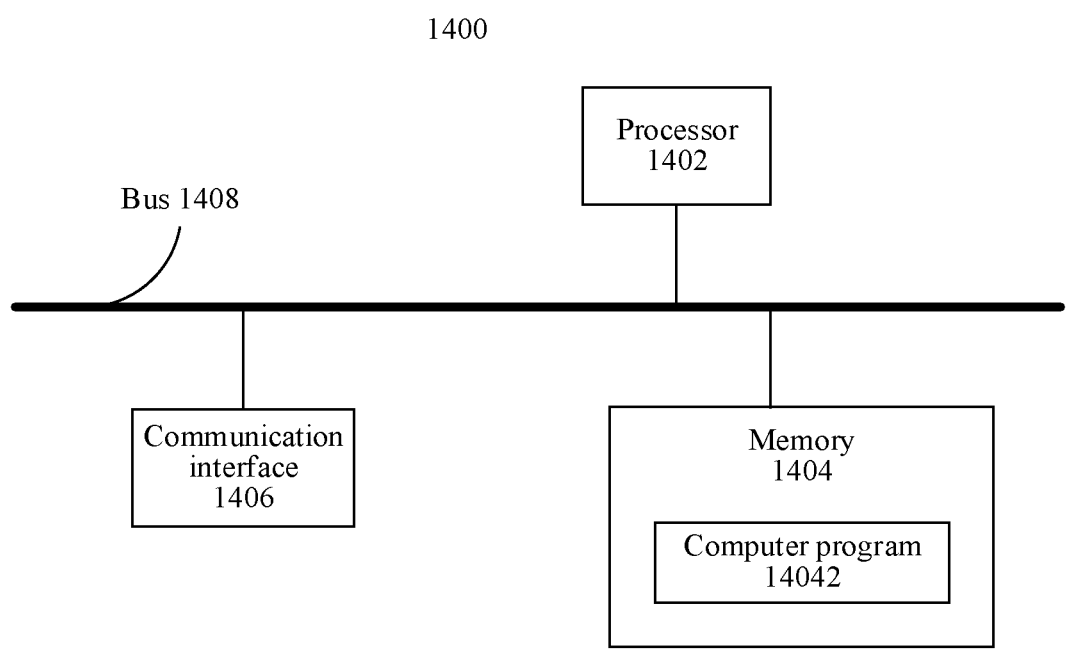
FIG. 14 is a schematic diagram of a hardware structure of a communication device according to an embodiment of this application.

FIG. 14 is a schematic diagram of a hardware structure of a communication device 1400 according to an embodiment of this application. The communication device 1400 may be a server or a network device. For example, the communication device 1400 may be the source end device or the target network device in the foregoing embodiment. Referring to FIG. 14, the communication device 1400 includes a processor 1402, a memory 1404, a communication interface 1406, and a bus 1408. The processor 1402, the memory 1404, and the communication interface 1406 are communicatively connected to each other through the bus 1408. A person skilled in the art should understand that a manner of connection between the processor 1402, the memory 1404, and the communication interface 1406 shown in FIG. 14 is merely an example. In an implementation process, the processor 1402, the memory 1404, and the communication interface 1406 may alternatively be communicatively connected to each other in a connection manner other than the bus 1408.

The memory 1404 may be configured to store a computer program 14042. The computer program 14042 may include instructions and data. In this embodiment of this application, the memory 1404 may be various types of storage media, for example, a random-access memory (RAM), a read-only memory (ROM), a non-volatile RAM (NVRAM), a programmable ROM (PROM), an erasable PROM (EPROM), an electrically-erasable PROM (EEPROM), a flash memory, an optical memory, a register, and the like. In addition, the memory 1404 may include a hard disk and/or a memory.

The processor 1402 may be a general-purpose processor. The general-purpose processor may be a processor that reads and executes a computer program (for example, the computer program 14042) stored in a memory (for example, the memory 1404) to perform a specific step and/or operation. In a process of performing the foregoing steps and/or operations, the general-purpose processor may use data stored in the memory (for example, the memory 1404). For example, the stored computer program may be executed to implement related functions of the setting module 1220, the determining module 1230, the construction module 1240, and the construction module 1330. The general-purpose processor may be, for example, but not limited to, a central processing unit (CPU). In addition, the processor 1402 may alternatively be a dedicated processor. The dedicated processor may be a processor specially designed to perform a specific step and/or operation. The dedicated processor may be, for example, but not limited to, a digital signal processor (DSP), an ASIC, an FPGA, or the like. In addition, the processor 1402 may alternatively be a combination of a plurality of processors, for example, a multi-core processor. The processor 1402 may include at least one circuit, to perform all or some of the steps in the packet transmission method provided in the foregoing embodiments.

The communication interface 1406 may include an interface for implementing component interconnection inside the communication device 1400, for example, an input/output (I/O) interface, a physical interface, or a logical interface, and an interface for implementing interconnection between the communication device 1400 and another device (for example, a network device or a server). The physical interface may be a gigabit Ethernet (GE) interface, and may be configured to implement interconnection between the communication device 1400 and another device (for example, a network device or a server). The logical interface is an interface inside the communication device 1400, and may be configured to implement interconnection of components inside the communication device 1400. It may be easily understood that the communication interface 1406 may be used by the communication device 1400 to communicate with another network device and/or a server. For example, the communication interface 1406 is used to receive and send a packet between the communication device 1400 and another network device. The communication interface 1406 may implement related functions of the sending module 1210, the receiving module 1250, the forwarding module 1310, the sending module 1320, and the receiving module 1340.

The bus 1408 may be any type of communication bus, for example, a system bus for implementing interconnection between the processor 1402, the memory 1404, and the communication interface 1406.

The foregoing components may be separately disposed on chips that are independent of each other, or at least some or all of the components may be disposed on a same chip. Whether the components are separately disposed on different chips or integrated and disposed on one or more chips usually depends on a requirement of a product design. This embodiment of this application imposes no limitation on specific implementations of the foregoing components.

The communication device 1400 shown in FIG. 14 is merely an example. In an implementation process, the communication device 1400 may further include other components, which are not enumerated one by one in this specification. The communication device 1400 shown in FIG. 14 may transmit a packet by performing all or some steps of the packet transmission method provided in the foregoing embodiments.

Figure 15:
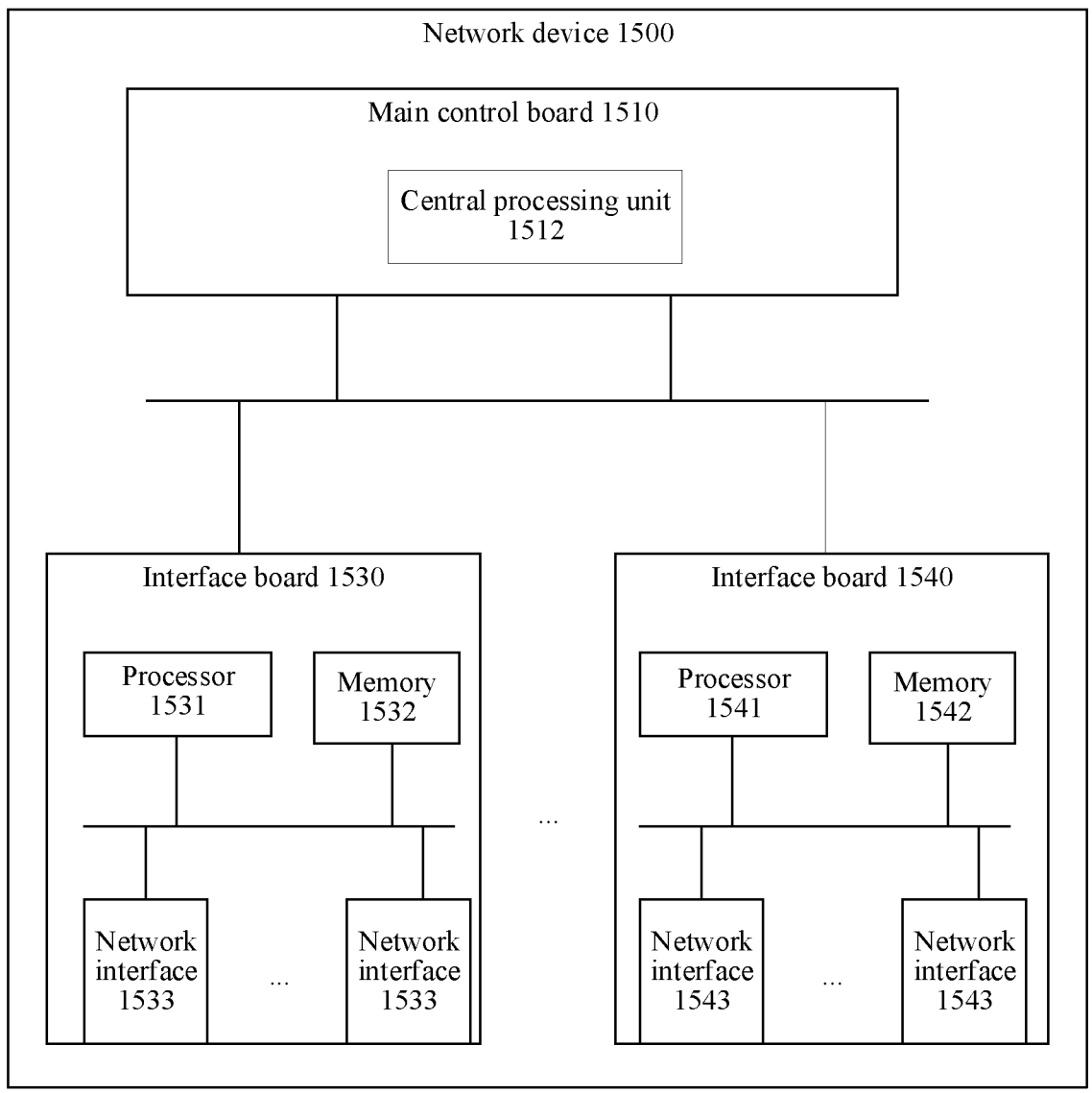
FIG. 15 is a schematic diagram of a hardware structure of a network device according to an embodiment of this application.

FIG. 15 is a schematic diagram of a hardware structure of a network device 1500 according to an embodiment of this application. The network device 1500 may be the target network device in the foregoing embodiment. The network device 1500 may be a switch, a router, or another network device that forwards a packet. In this embodiment, the network device 1500 includes a main control board 1510, an interface board 1530, and an interface board 1540. When there is a plurality of interface boards, a switching board (not shown in the figure) may be included. The switching board is configured to complete data exchange between the interface boards (the interface board is also referred to as a line card or a service board).

The main control board 1510 is configured to complete functions such as system management, device maintenance, and protocol processing. The interface board 1530 and the interface board 1540 are configured to provide various service interfaces (for example, a Packet-over-Synchronous Optical Networking (SONET)/Synchronous Digital Hierarchy (SDH) (POS) interface, a GE interface, and an Asynchronous Transfer Mode (ATM) interface), and implement packet forwarding. The main control board 1510 mainly includes three types of functional units such as a system management and control unit, a system clock unit, and a system maintenance unit. The main control board 1510, the interface board 1530, and the interface board 1540 are connected to a system backplane through a system bus to implement interworking. The interface board 1530 includes one or more processors 1531. The processor 1531 is configured to control and manage the interface board, communicate with a central processing unit 1512 on the main control board 1510, and forward a packet. The memory 1532 on the interface board 1530 is configured to store a forwarding table, and the processor 1531 forwards a packet by looking up the forwarding table stored in the memory 1532.

The interface board 1530 includes one or more network interfaces 1533, configured to receive a packet sent by a previous-hop node, and send a processed packet to a next-hop node based on instructions of the processor 1531. An implementation process is not described herein again. Functions of the processor 1531 are not described herein again.

It may be understood that, as shown in FIG. 15, this embodiment includes a plurality of interface boards, and uses a distributed forwarding mechanism. In this mechanism, operations on the interface board 1540 are basically similar to operations on the interface board 1530. For brevity, details are not described again. In addition, it may be understood that, the processor 1531 and/or a processor 1541 in the interface board 1530 in FIG. 15 may be dedicated hardware or a chip, for example, a network processor or an ASIC, to implement the foregoing functions. This implementation is a manner in which a forwarding plane generally uses dedicated hardware or a chip for processing. In another implementation, the processor 1531 and/or the processor 1541 may also use a general-purpose processor, for example, a general-purpose CPU, to implement the functions described above.

In addition, it should be noted that there may be one or more main control boards. When there is a plurality of main control boards, the main control boards may include an active main control board and a standby main control board. There may be one or more interface boards, and a device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes the plurality of interface boards. Data exchange between the plurality of interface boards may be implemented by using the switching board, to provide a large-capacity data exchange and processing capability. Therefore, a data access and processing capability of a network device in the distributed architecture is better than that of a device in the centralized architecture. A specific architecture that is to be used depends on a networking deployment scenario. This is not limited herein.

In an embodiment, the memory 1532 may be a ROM or another type of static storage device that can store static information and instructions, or a RAM or another type of dynamic storage device that can store information and instructions, or may be an EEPROM, a compact disc read-only memory (CD-ROM) or another optical disc storage, an optical disc storage (including a compact disc, a laser disc, an optical disc, a digital versatile disc (DVD), a Blu-ray disc, or the like), a magnetic disk, or another magnetic storage device, or any other medium that can be used to carry or store expected program code in a form of instructions or a data structure and that can be accessed by a computer. This is not limited thereto. The memory 1532 may exist independently, and is connected to the processor 1531 through the communication bus. Alternatively, the memory 1532 may be integrated with the processor 1531.

The memory 1532 is configured to store program code, and the processor 1531 controls execution of the program code, to perform the packet transmission method provided in the foregoing embodiments. The processor 1531 is configured to execute the program code stored in the memory 1532. The program code may include one or more software modules. The one or more software modules may be the functional modules provided in the embodiment in FIG. 13.

In an embodiment, the network interface 1533 may be an apparatus that uses any transceiver, and is configured to communicate with another device or a communication network, for example, an Ethernet, a radio access network (RAN), or a wireless local area network (WLAN).

Figure 16:
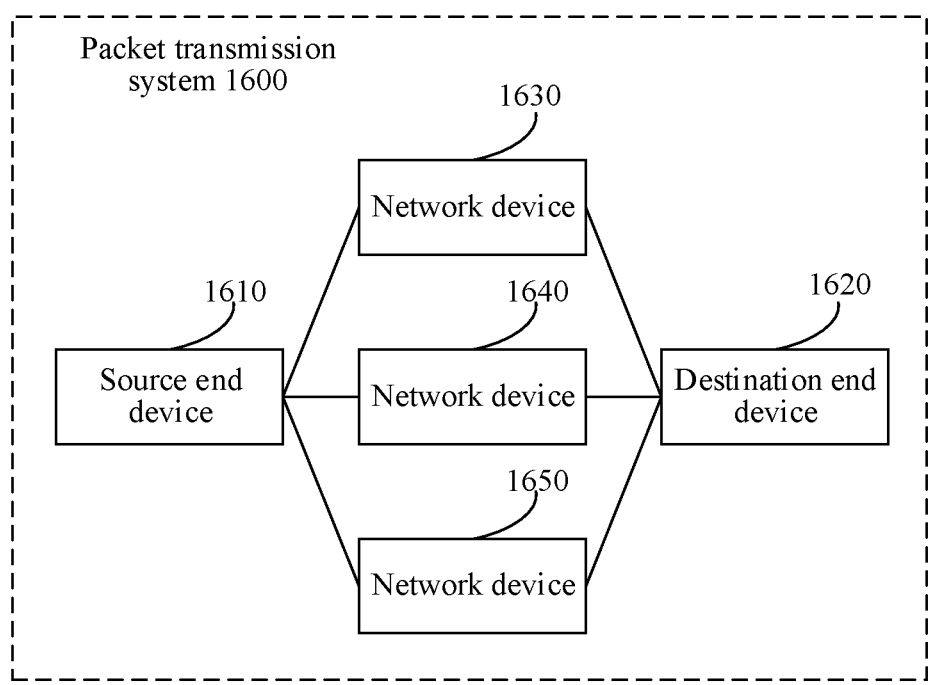
FIG. 16 is a schematic diagram of a structure of a packet transmission system according to an embodiment of this application.

FIG. 16 is a schematic diagram of a structure of a packet transmission system 1600 according to an embodiment of this application. The packet transmission system 1600 includes a source end device 1610, a destination end device 1620, and a plurality of network devices 1630 to 1650.

The source end device 1610 is configured to send a first packet, where the first packet carries first source routing information and a destination identifier. The first source routing information includes a port identifier of each network device on a first forwarding path, and the destination identifier indicates the destination end device 1620. A first network device (for example, the network device 1630) on the first forwarding path is configured to, when receiving the first packet, forward the first packet based on the first source routing information or the destination identifier, and preferentially forward the first packet based on the first source routing information.

Optionally, the first network device (for example, the network device 1630) is configured to forward the first packet based on the first source routing information if the first packet satisfies a source routing forwarding condition; or forward the first packet based on the destination identifier if the first packet does not satisfy a source routing forwarding condition but satisfies a forwarding table forwarding condition.

Optionally, an encapsulation type of the first packet is source routing encapsulation, the first packet further carries a source routing validity identifier, and the source routing validity identifier indicates that source routing encapsulated in the first packet is valid or invalid. The source routing forwarding condition includes that the source routing validity identifier indicates that the source routing encapsulated in the first packet is valid, and an egress port indicated by a port identifier of the first network device (for example, the network device 1630) in the first source routing information is in a working state, for example, in an UP state. The forwarding table forwarding condition includes that the source routing validity identifier indicates that the source routing encapsulated in the first packet is invalid; or the source routing validity identifier indicates that the source routing encapsulated in the first packet is valid, but an egress port indicated by a port identifier of the first network device (for example, the network device 1630) in the first source routing information is in a non-working state, for example, in a DOWN state.

Optionally, the forwarding table forwarding condition includes that the source routing validity identifier indicates that the source routing encapsulated in the first packet is valid, but an egress port indicated by a port identifier of the first network device (for example, the network device 1630) in the first source routing information is in a non-working state. The first network device (for example, the network device 1630) is configured to, if the first packet does not satisfy the source routing forwarding condition but satisfies the forwarding table forwarding condition, set the source routing validity identifier to indicate that the source routing encapsulated in the first packet is invalid, and forward the first packet based on the destination identifier.

Optionally, the forwarding table forwarding condition includes that the source routing validity identifier indicates that the source routing encapsulated in the first packet is valid, but an egress port indicated by a port identifier of the first network device (for example, the network device 1630) in the first source routing information is in a non-working state. The first network device (for example, the network device 1630) is further configured to, if the first packet does not satisfy the source routing forwarding condition but satisfies the forwarding table forwarding condition, send a fault notification message to the source end device 1610, where the fault notification message indicates that the first forwarding path is faulty.

Optionally, the source end device 1610 is further configured to, after receiving the fault notification message, set the first forwarding path as an invalid forwarding path.

Optionally, the source end device 1610 is further configured to, after receiving the fault notification message, send a second packet. The second packet carries second source routing information and the destination identifier. The second source routing information includes a port identifier of each network device on a second forwarding path, and a second network device (for example, the network device 1640) on the second forwarding path is configured to, when receiving the second packet, forward the second packet based on the second source routing information or the destination identifier, and preferentially forward the second packet based on the second source routing information.

Optionally, the source end device 1610 is configured to, when satisfying a source routing encapsulation condition, send the first packet. The source routing encapsulation condition includes that both the source end device 1610 and the destination end device 1620 support a source routing encapsulation function, and network devices on the first forwarding path support a source routing forwarding function.

Optionally, the source end device 1610 is further configured to, when not satisfying the source routing encapsulation condition, send a third packet. The third packet carries the destination identifier, and an encapsulation type of the third packet is Ethernet encapsulation.

Optionally, the source end device 1610 is further configured to, before sending the first packet, determine the first forwarding path based on a path table of the source end device 1610. The path table includes at least one path entry related to the destination end device 1620, and each of the at least one path entry indicates one forwarding path between the source end device 1610 and the destination end device 1620.

Optionally, the source end device 1610 is further configured to, before determining the first forwarding path based on the path table of the source end device 1610, construct the path table based on a network topology of the packet transmission system 1600, or receive the path table from a control device.

Optionally, the first network device (for example, the network device 1630) is further configured to, before forwarding the first packet based on the destination identifier, construct a forwarding table based on the network topology of the packet transmission system 1600, or receive the forwarding table from a control device.

The forwarding table includes at least one forwarding entry, and each of the at least one forwarding entry indicates a mapping relationship between one destination identifier and one port of the first network device.

Optionally, the first network device (for example, the network device 1630) is configured to, when receiving the first packet, if the first packet satisfies the source routing forwarding condition but a first-hop device of the first network device (for example, the network device 1630) does not support the source routing forwarding function, forward the first packet based on the destination identifier carried in the first packet, where the first-hop device is a next-hop device of the first network device (for example, the network device 1630).

The first-hop device is configured to, when receiving the first packet, forward the first packet based on the destination identifier carried in the first packet.

A second-hop device of the first network device (for example, the network device 1630) is configured to, when receiving the first packet, if the first packet satisfies the source routing forwarding condition and a third-hop device of the first network device (for example, the network device 1630) supports the source routing forwarding function, forward the first packet based on the first source routing information carried in the first packet. The second-hop device is a next-hop device of the first-hop device, and the third-hop device is a next-hop device of the second-hop device.

In conclusion, in the technical solution in this embodiment of this application, the packet sent by the source end device may carry the source routing information and the destination identifier. The source routing information includes the port identifier of each network device on the forwarding path, and the destination identifier indicates the destination end device. After receiving the packet, the network device on the forwarding path forwards the packet based on the source routing information or the destination identifier, and preferentially forwards the packet based on the source routing information. Therefore, if the forwarding path is not faulty, the network device on the forwarding path may forward the packet based on the source routing information. This helps shorten a transmission delay of the packet from the source end device to the destination end device. If the forwarding path is faulty because the egress port indicated by the port identifier in the source routing information is in a non-working state, the network device on the forwarding path may forward the packet based on the destination identifier. This helps avoid a packet loss caused because the forwarding path is faulty. According to the technical solutions provided in this application, a packet loss can be avoided and a transmission delay of a packet can be shortened, to help improve flexibility and reliability of packet transmission.

An embodiment of this application provides a packet transmission system, including a source end device and a target network device. The source end device is the source end device 1200 shown in FIG. 12, and the target network device is the target network device 1300 shown in FIG. 13. Alternatively, at least one of the source end device and the target network device is the communication device 1400 shown in FIG. 14. Alternatively, the target network device is the network device 1500 shown in FIG. 15. Optionally, the source end device is a server, and the target network device is a forwarding device, for example, a switch or a router.

An embodiment of this application provides a computer-readable storage medium. The computer-readable storage medium stores a computer program. When the computer program is executed by a processor, all or some of the steps of the packet transmission methods provided in the foregoing method embodiments are implemented.

An embodiment of this application provides a computer program product including instructions. When the computer program product is run on a computer, the computer is enabled to perform all or some of the steps of the packet transmission methods provided in the foregoing method embodiments.

An embodiment of this application provides a chip. The chip includes a programmable logic circuit and/or program instructions. When the chip is run, the chip is configured to implement all or some of the steps of the packet transmission methods provided in the foregoing method embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely intended for description, but cannot be understood as an indication or implication of relative importance. The term "at least one" refers to one or more, and the term "a plurality of" refers to two or more, unless expressly limited otherwise.

For different types of embodiments such as the method embodiment and the apparatus embodiment provided in embodiments of this application, refer to each other. This is not limited in embodiments of this application. A sequence of the operations of the method embodiment provided in embodiments of this application can be properly adjusted, and the operations can be correspondingly added or deleted based on a situation. Any modified method that can be easily figured out by a person skilled in the art without departing from a technical scope disclosed in this application shall fall within the protection scope of this application, and therefore details are not described again.

In the corresponding embodiments provided in this application, it should be understood that the disclosed apparatus and the like may be implemented in other composition manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings, direct couplings or communication connections may be implemented through some interfaces. The indirect couplings or communication connections between the apparatuses or units may be implemented in electronic or other forms.

The units described as separate parts may or may not be physically separate, and parts described as units may or may not be physical units, that is, may be located at one position, or may be distributed on a plurality of network devices (for example, terminal devices). Some or all of the units may be selected based on actual requirements to achieve the objectives of the solutions of embodiments.

The foregoing descriptions are example implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A packet transmission system, comprising:
a destination end device;
a source end device configured to send a first packet, wherein the first packet carries first source routing information, a source routing validity identifier, and a destination identifier, wherein the first source routing information comprises port identifiers of each network device of a plurality of network devices on a first forwarding path, and wherein the destination identifier indicates the destination end device; and
a first network device of the plurality of network devices and on the first forwarding path, wherein the first network device is configured to:
receive the first packet;
either forward the first packet based on the first source routing information when the first packet satisfies a source routing forwarding condition or forward the first packet based on the destination identifier when the first packet does not satisfy the source routing forwarding condition and satisfies a forwarding table forwarding condition, wherein the forwarding table forwarding condition is that the source routing validity identifier indicates that source routing encapsulation in the first packet is valid and an egress port in the first source routing information is in a non-working state, and wherein the egress port is indicated by a port identifier of the first network device; and
forward the first packet.

2. The packet transmission system of claim 1, wherein an encapsulation type of the first packet is source routing encapsulation, and wherein the source routing validity identifier indicates that the source routing encapsulation is valid or invalid.

3. The packet transmission system of claim 1, wherein the source routing forwarding condition comprises that the source routing validity identifier indicates that the source routing encapsulation is valid and the egress port in the first source routing information is in a working state, and wherein the egress port is indicated by the port identifier.

4. The packet transmission system of claim 1, wherein the forwarding table forwarding condition comprises that the source routing validity identifier indicates that the source routing encapsulation is invalid.

5. The packet transmission system of claim 1, wherein the first network device is further configured to:
set the source routing validity identifier that indicates the source routing encapsulation is invalid when the first packet does not satisfy the source routing forwarding condition and satisfies the forwarding table forwarding condition; and
forward the first packet based on the destination identifier.

6. The packet transmission system of claim 1, wherein the first network device is further configured to send a fault notification message to the source end device when the first packet does not satisfy the source routing forwarding condition and satisfies the forwarding table forwarding condition, and wherein the fault notification message indicates that the first forwarding path is faulty.

7. The packet transmission system of claim 6, wherein the source end device is further configured to set the first forwarding path as an invalid forwarding path after receiving the fault notification message.

8. The packet transmission system of claim 6, wherein the source end device is further configured to send a second packet after receiving the fault notification message, wherein the second packet carries second source routing information and the destination identifier, wherein the second source routing information comprises port identifiers of each network device of the plurality of network devices on a second forwarding path, wherein the packet transmission system further comprises a second network device on the second forwarding path, and wherein the second network device is configured to:
  receive the second packet;
  determine whether to forward the second packet based on the second source routing information or the destination identifier; and
  forward the second packet based on the second source routing information.

9. A packet transmission method comprising:
  sending a first packet to a first network device on a first forwarding path,
  wherein the first packet carries first source routing information, a source routing validity identifier, and a destination identifier,
  wherein the first source routing information comprises port identifiers of each network device on the first forwarding path,
  wherein the destination identifier indicates a destination end device, and
  wherein the first packet enables the first network device on the first forwarding path to either forward the first packet based on the first source routing information when the first packet satisfies a source routing forwarding condition or forward the first packet based on the destination identifier when the first packet does not satisfy the source routing forwarding condition and satisfies a forwarding table forwarding condition, wherein the forwarding table forwarding condition is that the source routing validity identifier indicates that source routing encapsulation in the first packet is valid and an egress port in the first source routing information is in a non-working state, and wherein the egress port is indicated by a port identifier of the first network device.

10. The packet transmission method of claim 9, wherein an encapsulation type of the first packet is source routing encapsulation, and wherein the source routing validity identifier indicates that the source routing encapsulation is valid or invalid.

11. The packet transmission method of claim 9, further comprising sending a second packet after sending the first packet and in response to receiving a fault notification message indicating that the first forwarding path is faulty, wherein the second packet carries second source routing information and the destination identifier, wherein the second source routing information comprises second port identifiers of each network device on a second forwarding path, and wherein the second source routing information enables a second network device on the second forwarding path to determine whether to forward the second packet based on the second source routing information or the destination identifier, and to forward the second packet based on the second source routing information.

12. The packet transmission method of claim 9, further comprising:
  receiving a fault notification message that indicates that the first forwarding path is faulty; and
  setting the first forwarding path as an invalid forwarding path after receiving the fault notification message.

13. A packet transmission method, comprising:
  receiving a first packet carrying first source routing information and a destination identifier, wherein the first source routing information comprises port identifiers of each network device on a first forwarding path, and wherein the destination identifier indicates a destination end device;
  either forwarding the first packet based on the first source routing information when the first packet satisfies a source routing forwarding condition or forwarding the first packet based on the destination identifier when the first packet does not satisfy the source routing forwarding condition and satisfies a forwarding table forwarding condition, wherein the forwarding table forwarding condition is that the source routing validity identifier indicates that source routing encapsulation in the first packet is valid and an egress port in the first source routing information is in a non-working state, and wherein the egress port is indicated by a port identifier of a first network device; and
  forwarding the first packet based on the determination.

14. The packet transmission method of claim 13, wherein an encapsulation type of the first packet is source routing encapsulation, and wherein the source routing validity identifier indicates that the source routing encapsulation is valid or invalid.

15. The packet transmission method of claim 13, wherein the source routing forwarding condition comprises that the source routing validity identifier indicates that the source routing encapsulation is valid and the egress port indicated by a second port identifier of a target network device in the first source routing information is in a working state.

16. The packet transmission method of claim 13, wherein when the first packet does not satisfy the source routing forwarding condition, the packet transmission method further comprises:
  setting the source routing validity identifier to indicate that the source routing encapsulation is invalid when the first packet satisfies the forwarding table forwarding condition.

17. The packet transmission method of claim 13, wherein the forwarding table forwarding condition comprises that the source routing validity identifier indicates that the source routing encapsulation is invalid.

18. The packet transmission method of claim 13, further comprising setting the source routing validity identifier that indicates the source routing encapsulation in the first packet is invalid when the first packet does not satisfy the source routing forwarding condition and satisfies the forwarding table forwarding condition.

19. The packet transmission method of claim 13, sending a fault notification message to a source end device when the first packet does not satisfy the source routing forwarding condition and satisfies the forwarding table forwarding condition, and wherein the fault notification message indicates that a first forwarding path is faulty.

20. The packet transmission method of claim 19, further comprising setting the first forwarding path as an invalid forwarding path after receiving the fault notification message.

* * * * *